United States Patent
Omer et al.

(10) Patent No.: US 10,567,914 B1
(45) Date of Patent: *Feb. 18, 2020

(54) INITIALIZING PROBABILITY VECTORS FOR DETERMINING A LOCATION OF MOTION DETECTED FROM WIRELESS SIGNALS

(71) Applicant: Cognitive Systems Corp., Waterloo (CA)

(72) Inventors: Mohammad Omer, Waterloo (CA); Stephen Arnold Devison, Kitchener (CA); Oleksiy Kravets, Petersburg (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,681

(22) Filed: Apr. 30, 2019

(51) Int. Cl.
*H04W 4/02* (2018.01)
*H04L 12/26* (2006.01)
*H04W 84/18* (2009.01)

(52) U.S. Cl.
CPC ......... *H04W 4/023* (2013.01); *H04L 43/0811* (2013.01); *H04W 4/027* (2013.01); *H04W 84/18* (2013.01)

(58) Field of Classification Search
None
See application file for complete search history.

(56) References Cited

U.S. PATENT DOCUMENTS

| 4,054,879 | A | 10/1977 | Wright et al. |
| 4,649,388 | A | 3/1987 | Atlas |

(Continued)

FOREIGN PATENT DOCUMENTS

| CA | 2834522 | 5/2014 |
| CA | 2945702 | 8/2015 |

(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — James P Duffy
(74) *Attorney, Agent, or Firm* — Henry Patent Law Firm PLLC

(57) ABSTRACT

In a general aspect, a method for determining a location of motion detected by wireless communication devices in a wireless communication network includes obtaining a set of motion indicator values associated with a prior time frame. The method also includes generating a prior probability vector based on the set of motion indicator values and comprising values for wireless communication devices connected to the wireless communication network during the prior time frame. The method additionally includes selecting the prior probability vector or one of a plurality of initialization probability vectors based on the set of motion indicator values, a configuration of the wireless communication network, or both. The method further includes using the selected probability vector and a set of motion indicators associated a second, subsequent time frame to identify a location associated with motion that occurred during the subsequent time frame.

22 Claims, 12 Drawing Sheets

(56) References Cited

U.S. PATENT DOCUMENTS

| | | |
|---|---|---|
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,914,854 B1 | 7/2005 | Heberley et al. |
| 7,652,617 B2 | 1/2010 | Kurtz et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,030,321 B2 | 5/2015 | Breed |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,459,074 B1 | 10/2019 | Omer et al. |
| 10,506,384 B1 | 12/2019 | Omer et al. |
| 2003/0108119 A1 | 6/2003 | Mohebbi et al. |
| 2006/0152404 A1 | 7/2006 | Fullerton et al. |
| 2006/0284757 A1 | 12/2006 | Zemany |
| 2007/0149197 A1 | 6/2007 | Lee et al. |
| 2007/0296571 A1 | 12/2007 | Kolen |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2012/0115512 A1 | 5/2012 | Grainger et al. |
| 2012/0146788 A1* | 6/2012 | Wilson .............. G08B 13/187 340/539.23 |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355595 A1 | 12/2014 | Curtiss |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2016/0018508 A1 | 1/2016 | Chen et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2016/0262355 A1 | 9/2016 | Swan |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0126488 A1 | 5/2017 | Cordeiro et al. |
| 2017/0146656 A1 | 5/2017 | Belsley et al. |
| 2017/0155439 A1 | 6/2017 | Chang et al. |
| 2017/0195893 A1 | 7/2017 | Lee et al. |
| 2017/0223628 A1 | 8/2017 | Snyder et al. |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0180706 A1 | 6/2018 | Li et al. |
| 2018/0288587 A1 | 10/2018 | Allegue Martinez et al. |
| 2018/0330293 A1 | 11/2018 | Kulkarni et al. |
| 2019/0158340 A1 | 5/2019 | Zhang et al. |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014/021574 | 2/2014 |
| WO | 2014/201574 | 12/2014 |
| WO | 2015/168700 | 11/2015 |
| WO | 2016005977 | 1/2016 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017177303 | 10/2017 |
| WO | 2017/210770 | 12/2017 |

(56) References Cited

FOREIGN PATENT DOCUMENTS

| WO | 2018/094502 | 5/2018 |
|---|---|---|
| WO | 2019041019 | 3/2019 |

OTHER PUBLICATIONS

Domenico, et al., "Exploring Training Options for RF Sensing Using CSI", IEEE Communications Magazine, 2018, vol. 56, Issue 5, pp. 116-123, 8 pgs.

Iqbal, et al., "Indoor Motion Classification Using Passive RF Sensing Incorporating Deep Learning", ISSN: 2577-2465, Electronic IEEE, Jun. 3, 2018, 5 pgs.

Kosba, et al., "Robust WLAN Device-free Passive Motion Detection", IEEE Wireless Communications and Networking Conference, Apr. 2012, 6 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

USPTO, Notice of Allowance dated Aug. 6, 2019, in U.S. Appl. No. 16/399,657, 27 pgs.

USPTO, Notice of Allowance dated Aug. 8, 2019, in U.S. Appl. No. 16/207,649, 37 pgs.

\* cited by examiner $$[N, C] = \forall_{i\, in\, N} \sum_{j} I\left(i, j \in J = \left[\bigcup_{m=1:M} \{a\},\{b\} \text{ for } (a \to b) \in L^{m}_{t}\right]\right) \quad I(i,j) = \begin{cases} 1, i = j \\ 0, i \neq j \end{cases}$$

- Split each link into its two component nodes
- Split $M$ such links, where $M$ is tunable, and perform a union over all the split nodes
- Compare each node in the union, to each node in the node dictionary, and generate a one, whenever they match. Adding all the ones, amount to at count for the number of times each node is present.

$[N, NLL] = \forall_{i\, in\, N} LLmap(i, C_i)$

- Form a tuple of node and its counts
- Each count is mapped to a likelihood value through a look-up table (or link likelihood map)

FIG. 5B

INITIALIZING PROBABILITY VECTORS FOR DETERMINING A LOCATION OF MOTION DETECTED FROM WIRELESS SIGNALS

BACKGROUND

The following description relates to initializing probability vectors for determining a location of motion detected from wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 5B is an example mathematical function for generating a probability vector using a likelihood calculator.

DETAILED DESCRIPTION

Figure 1:
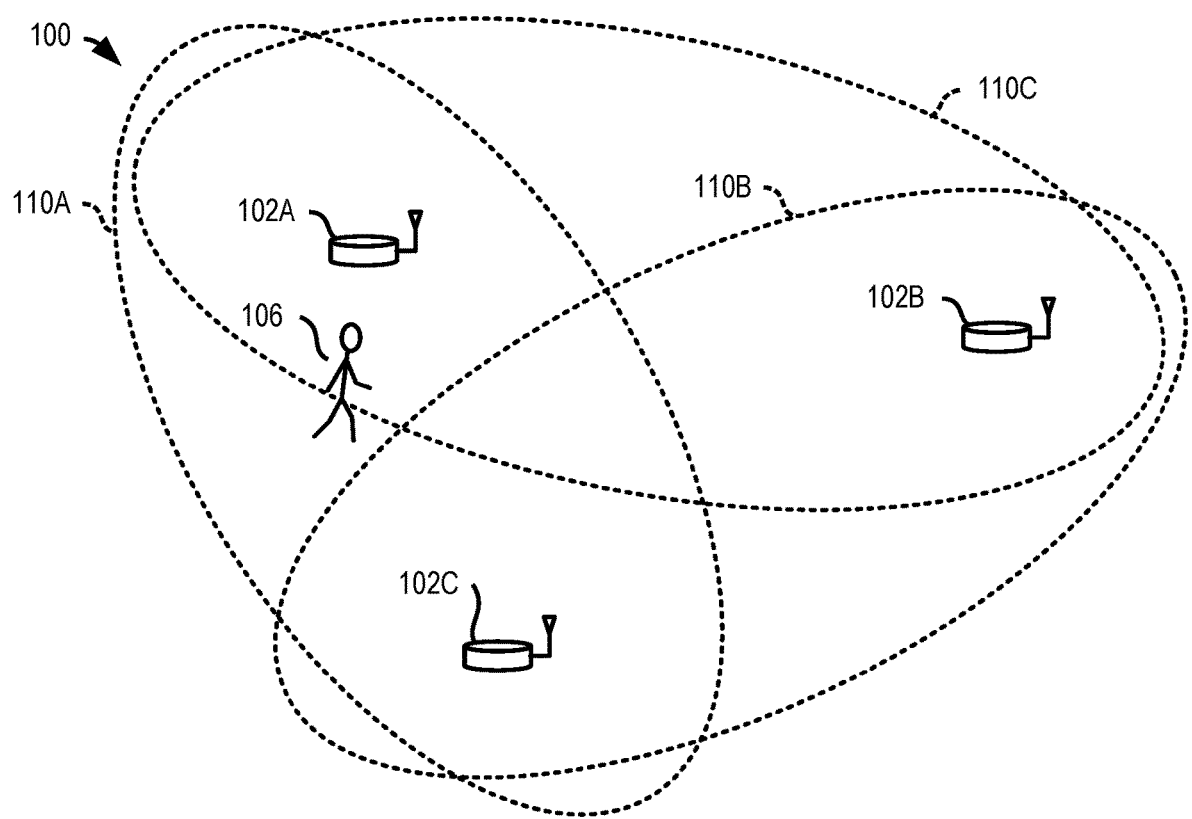
FIG. 1 is a diagram showing an example wireless communication system.

In some aspects of what is described here, the location of motion in a space (e.g., the particular room in a house where a person is moving, a particular floor or quadrant of a building where a person is moving, etc.) may be detected using information from multiple wireless communication devices communicating with each other wirelessly.

For instance, wireless signals received at each of the wireless communication devices in a wireless communication network may be analyzed to determine channel information for the different communication links in the network (between respective pairs of wireless communication devices in the network). The channel information may be representative of a physical medium that applies a transfer function to wireless signals that traverse the space. In some instances, the channel information includes channel response information. Channel response information may refer to known channel properties of a communication link, and may describe how a wireless signal propagates from a transmitter to a receiver, representing the combined effect of, for example, scattering, fading, and power decay within the space between the transmitter and receiver. In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming steering matrix may include a mathematical description of how the antenna array should use each of its individual antenna elements to select a spatial path for transmission. While certain aspects are described herein with respect to channel response information, beamforming state information or beamformer steering matrix state may also be used in the aspects described as well.

The channel information for each of the communication links may be analyzed (e.g., by a hub device or other device in the network, or a remote device communicably coupled to the network) to detect whether motion has occurred in the space, to determine a relative location of the detected motion, or both. In some aspects, the channel information for each of the communication links may be analyzed to detect whether an object is present or absent, e.g., when no motion is detected in the space.

In some implementations, the wireless communication network may include a wireless mesh network. A wireless mesh network may refer to a decentralized wireless network whose nodes (e.g. wireless communication devices) communicate directly in a point-to-point manner without using a central access point, base station or network controller. Wireless mesh networks may include mesh clients, mesh routers, or mesh gateways. In some instances, a wireless mesh network is based on the IEEE 802.11s standard. In some instances, a wireless mesh network is based on Wi-Fi ad hoc or another standardized technology. Examples of commercially-available wireless mesh networks include Wi-Fi systems sold by Google, Eero, and others.

In some example wireless communication networks, each node is connected to one or more other nodes through one or more bi-directional links. Each node can analyze the wireless signals that it receives to identify the perturbation or disturbance on each of the links. The disturbance on each link can be represented as a motion indicator value, for example, as a scalar quantity that can be normalized. The link disturbance values from the nodes in the wireless communication network can be used to determine the probability of motion at the locations associated with the respective node. For example, the probability of motion at each node can be used to tell which node has the highest probability of having motion in its vicinity, and that node can be identified as the node around which the motion occurred. In order to do this, the analysis can be case in a Bayesian estimation framework, for the recursive computation of probabilities. The probabilistic framework offers a number of technical advantages, for example, providing recursive estimation and hence eventual convergence to a correct result, simplistic logic with no conditions for each special situation, performance that is more accurate and robust (e.g., to artifacts) and others.

In addition, physical insights regarding the motion detection system can inform the Bayesian estimation framework that is used to detect the location of motion. For example, the relative magnitude of excitation on a link (between a transmitter node and receiver node) is likely to be greater when the motion that creates the excitation is nearer the receiver node. Accordingly, as an initial probability estimate for where motion occurred, the highest probabilities can be assigned to the receiver nodes on wireless links associated with the highest motion indicator values. This initial probability estimate can be combined with a conditional probability distribution (e.g., based on prior motion data) to produce a recursively refined probability estimate according to a Bayesian framework. As another example, in certain contexts the likelihood of motion transitioning between distinct locations can be higher or lower, relative to the likelihood of motion remaining in a single location. Accordingly, location transition probabilities can be incorporated into the Bayesian framework. For example, a transition probability matrix can be combined with the initial probability estimate and the conditional probability distribution to produce the recursively refined probability estimate according to the Bayesian framework.

FIG. 1 is a diagram showing an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others. In the example shown in FIG. 1, the wireless communication devices 102A, 102B, 102C can be, or may include, standard wireless network components. For example, the wireless communication devices 102A, 102B, 102C may be commercially-available Wi-Fi devices.

In some cases, the wireless communication devices 102A, 102B, 102C may be Wi-Fi access points or another type of wireless access point (WAP). The wireless communication devices 102A, 102B, 102C may be configured to perform one or more operations as described herein that are embedded as instructions (e.g., software or firmware) on the wireless communication devices. In some cases, one or more of the wireless communication devices 102A, 102B, 102C may be nodes of a wireless mesh network, such as, for example, a commercially-available mesh network system (e.g., Google Wi-Fi, Eero Wi-Fi systems, etc.). In some cases, another type of standard or conventional Wi-Fi transceiver device may be used. The wireless communication devices 102A, 102B, 102C may be implemented without Wi-Fi components; for example, other types of wireless protocols for wireless communication, either standard or non-standard, may be used for motion detection.

In the example shown in FIG. 1, the wireless communication devices, e.g., 102A, 102B, transmit wireless signals over a communication channel (e.g., according to a wireless network standard, a motion detection protocol, a presence detection protocol, or other standard or non-standard protocol). For example, the wireless communication devices may generate motion probe signals for transmission to probe a space to detect motion or presence of an object. In some implementations, the motion probe signals may include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, one or more of the wireless communication devices may process motion detection signals, which are signals received based on motion probe signals transmitted through the space. For example, the motion detection signals may be analyzed to detect motion of an object in a space, lack of motion in the space, or the presence or absence of an object in the space when lack of motion is detected, based on changes (or lack thereof) detected in the communication channel.

The wireless communication devices transmitting motion probe signals, e.g. 102A, 102B, may be referred to as source devices. In some cases, wireless communication devices 102A, 102B may broadcast the wireless motion probe signals (e.g., described above). In other cases, the wireless communication devices 102A, 102B may send wireless signals addressed to another wireless communication device 102C and other devices (e.g., a user equipment, a client device, a server, etc.). The wireless communication device 102C as well as the other devices (not shown) may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In some examples, the wireless communication device 102C, which may be referred to as a sensor device, processes the wireless signals received from the wireless communication devices 102A, 102B to detect motion, or lack of motion, of an object in a space accessed by the wireless signals. In some examples, another device or computing system processes the wireless signals received by the wireless communication device 102C from the wireless communication devices 102A, 102B to detect motion, or lack of motion, of an object in a space accessed by the wireless signals. In some cases, the wireless communication device 102C (or another system or device) processes the wireless signals to detect the presence or absence of an object in a space when lack of motion is detected. In some instances, the wireless communication device 102C (or another system or device) may perform one or more operations as described in relation to FIG. 6 or in the example method described method to FIG. 8, or another type of process for detecting motion, detecting lack of motion, or detecting the presence or absence of an object when lack of motion is detected. In other examples, the wireless communication system 100 may be modified, for instance, such that the wireless communication device 102C can transmit wireless signals, e.g. as a source device, and the wireless communication devices 102A, 102B may process the wireless signals, e.g. as sensor devices, from the wireless communication device 102C, to detect motion, lack of motion, or presence when no motion is detected. That is, each of the wireless communication devices 102A, 102B, 102C, may be configured, in some cases, as a source device, a sensor device, or both.

The wireless signals used for motion and/or presence detection can include, for example, a beacon signal (e.g., Bluetooth Beacons, Wi-Fi Beacons, other wireless beacon signals), pilot signals (e.g., pilot signals used for channel sounding, such as in beamforming applications, according to the IEEE 802.11ac-2013 standard), or another standard signal generated for other purposes according to a wireless network standard, or non-standard signals (e.g., random signals, reference signals, etc.) generated for motion and/or presence detection or other purposes. In some cases, the wireless signals for motion and/or presence detection are known to all devices in the network.

In some examples, the wireless signals may propagate through an object (e.g., a wall) before or after interacting with a moving object, which may allow the moving object's movement to be detected without an optical line-of-sight between the moving object and the transmission or receiving hardware. In some cases, the wireless signals, when received by a wireless communication device, e.g. 102C, may indicate lack of motion in a space, for example, that an object is not moving, or no longer moving, in the space. In some cases, the wireless signals, when received by a wireless communication device, e.g. 102C, may indicate the presence of an object in the space when lack of motion is detected. Conversely, the wireless signals may indicate the absence of an object in the space when lack of motion is detected. For example, based on the received wireless signals, the third wireless communication device 102C may generate motion data, presence data, or both. In some instances, the third wireless communication device 102C may communicate the motion detection and/or presence data, to another device or system, such as a security system, that may include a control center for monitoring movement within a space, such as a room, building, outdoor area, etc.

In some implementations, the wireless communication devices 102A, 102B may be configured to transmit motion probe signals (e.g., as described above) on a wireless communication channel separate from wireless network traffic signals (e.g., a frequency channel or coded channel). For example, the modulation applied to the payload of a motion probe signal and the type of data or data structure in the payload may be known by the third wireless communication device 102C, which may reduce the amount of processing that the third wireless communication device 102C performs for motion and presence detection. The header may include additional information such as, for example, an indication of whether motion or lack of motion was detected by another device in the communication system 100, whether a presence of an object was detected by another device in the communication system 100, an indication of the modulation type, an identification of the device transmitting the signal, and so forth.

In the example shown in FIG. 1, the wireless communication system 100 is illustrated as a wireless mesh network, with wireless communication links between each of the respective wireless communication devices 102. In the example shown, the wireless communication links between the third wireless communication device 102C and the first wireless communication device 102A can be used to probe a first motion detection zone 110A, the wireless communication links between the third wireless communication device 102C and the second wireless communication device 102B can be used to probe a second motion detection zone 110B, and the wireless communication links between the first wireless communication device 102A and the second wireless communication device 102B can be used to probe a third motion detection zone 110C. In some instances, each wireless communication device 102 may be configured to detect motion, lack of motion, and/or the presence or absence of an object when no motion is detected, in each of the motion detection zones 110 accessed by that device by processing received signals that are based on wireless signals transmitted by the wireless communication devices 102 through the motion detection zones 110. For example, when a person 106 moves in the first motion detection zone 110A and the third motion detection zone 110C, the wireless communication devices 102 may detect the motion based on signals they receive that are based on wireless signals transmitted through the respective motion detection zones 110. For instance, the first wireless communication device 102A can detect motion of the person in both the first and third motion detection zones 110A, 110C, the second wireless communication device 102B can detect motion of the person 106 in the third motion detection zone 110C, and the third wireless communication device 102C can detect motion of the person 106 in the first motion detection zone 110A. In some cases, lack of motion by the person 106 and, in other cases, the presence of the person 106 when the person 106 is not detected to be moving, may be detected in each of the motion detection zones 110A, 110B, 110C.

In some instances, the motion detection zones 110 can include, for example, air, solid materials, liquids, or another medium through which wireless electromagnetic signals may propagate. In the example shown in FIG. 1, the first motion detection zone 110A provides a wireless communication channel between the first wireless communication device 102A and the third wireless communication device 102C, the second motion detection zone 110B provides a wireless communication channel between the second wireless communication device 102B and the third wireless communication device 102C, and the third motion detection zone 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement or lack of movement of an object in a space, and may be used to detect the presence (or absence) of an object in the space when there is a lack of movement detected. The objects can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may trigger further analysis to determine the presence or absence of an object when motion of the object is not detected.

In some implementations, the wireless communication system 100 may be, or may include, a motion detection system. The motion detection system may include one or more of the wireless communication devices 102A, 102B, 102C and possibly other components. One or more wireless communication devices 102A, 102B, 102C in the motion detection system may be configured for motion detection, presence detection, or both. The motion detection system may include a database that stores signals. One of the wireless communication devices 102A, 102B, 102C of the motion detection system may operate as a central hub or server for processing received signals and other information to detect motion and/or presence. The storage of data—e.g., in the database, and/or the determination of motion, lack of motion (e.g., a steady state), or presence detection—may be performed by a wireless communication device 102, or in some cases, may be performed by another device in the wireless communication network or in the cloud (e.g., by one or more remote devices).

Figure 2A:
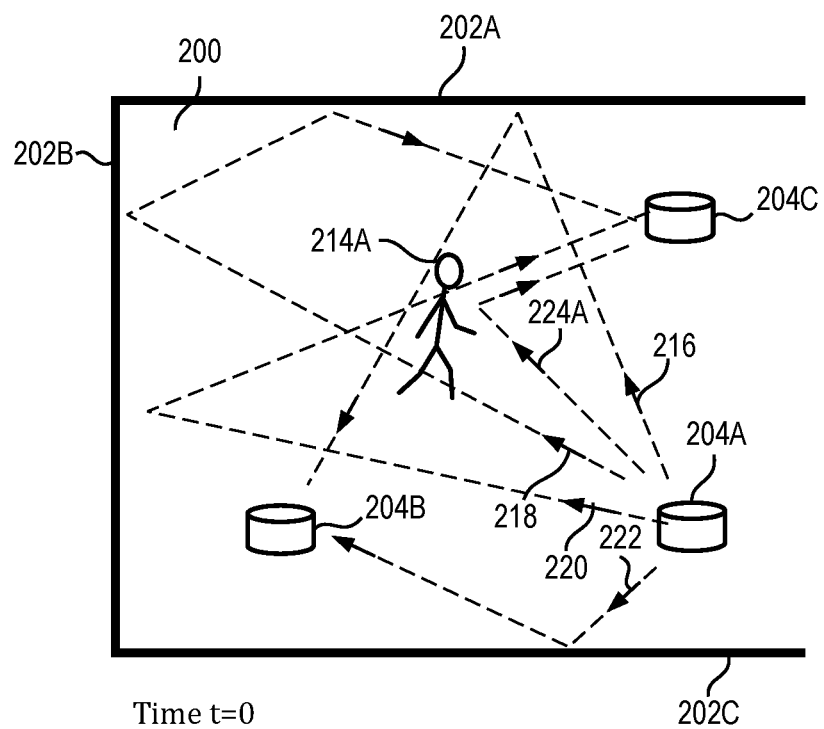
FIGS. 2A and 2B are diagrams showing example wireless signals communicated between wireless communication devices in a motion detection system.
Figure 2B:
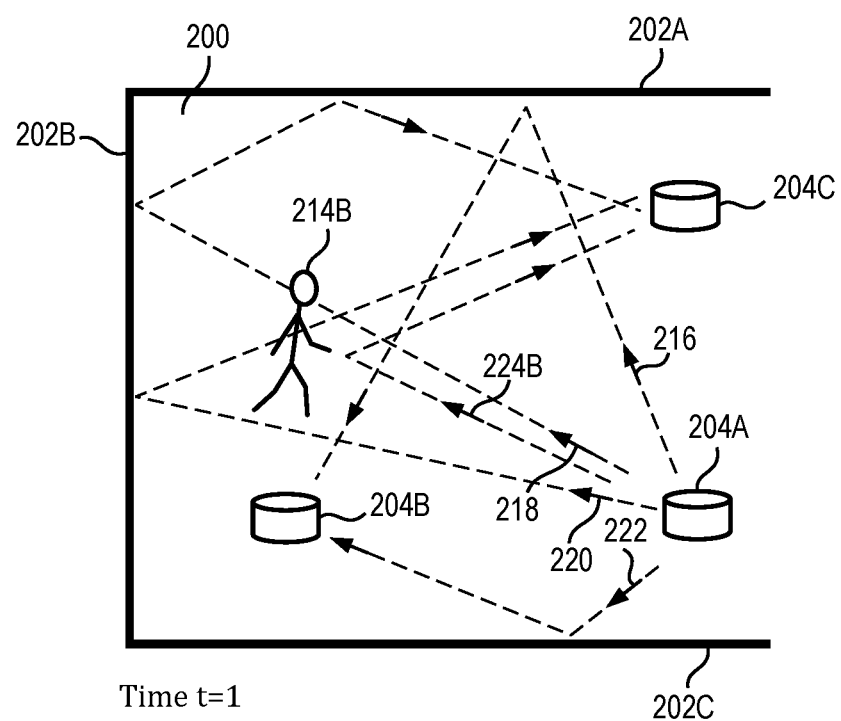

FIGS. 2A and 2B are diagrams showing example wireless signals communicated between wireless communication devices 204A, 204B, 204C in a motion detection system. The wireless communication devices 204A, 204B, 204C may be, for example, the wireless communication devices 102A, 102B, 102C shown in FIG. 1, or may be other types of wireless communication devices. Examples of wireless communication devices include wireless mesh devices, stationary wireless client devices, mobile wireless client devices, and so forth.

In some cases, a combination of one or more of the wireless communication devices 204A, 204B, 204C can form, or may be part of, a dedicated motion detection system. For example, as part of the dedicated motion detection system, one or more of the wireless communication devices 204A, 204B, 204C may be configured for motion detection, presence detection, or both, in the motion detection system. In some cases, a combination of one or more of the wireless communication devices 204A, 204B, 204C may be, or may be part of, an ad hoc motion detection system that also performs other types of functions.

The example wireless communication devices 204A, 204B, 204C may transmit and/or receive wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.), e.g., as a source device. The second and third wireless communication devices 204B, 204C are operable to receive signals based on the motion probe signals transmitted by the wireless communication device 204A, e.g., as a sensor device. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard). The wireless communication devices 204B, 204C each have an interface, modem, processor, or other component that is configured to process received motion detection signals to detect motion or lack of motion, of an object in the space 200. In some instances, the wireless communication devices 204B, 204C may each have an interface, modem, processor, or other component that is configured to detect the presence or absence of an object in the space 200 when lack of motion is detected, for example, whether the space is occupied or non-occupied.

As shown, an object is in a first position 214A at an initial time t=0 in FIG. 2A, and the object has moved to a second position 214B at subsequent time t=1 in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. For this example, the representation of the object's 214 movement is merely indicative that the object's location changed within the space 200 between time t=0 and time t=1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t=0 in FIG. 2A and time t=1 in FIG. 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A may be configured as a source device and may repeatedly transmit a wireless signal. For example, FIG. 2A shows the wireless signal being transmitted from the first wireless communication device 204A during a first time t=0. The transmitted signal may be transmitted continuously, periodically, at random or intermittent times or the like, or a combination thereof. For example, the transmitted signal may be transmitted one or more times between time t=0 and a subsequent time t=1 illustrated in FIG. 2B, or any other subsequent time. The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—does not change. Lack of change in the received signal (e.g., a steady state) may indicate lack of movement in the space 200.

Mathematically, a transmitted signal f(t) transmitted from the first wireless communication device 204A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} \left(\alpha_{n,k} e^{j\phi_{n,k}}\right) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}} \quad (5)$$

The complex value $Y_n$ for a given frequency component on indicates a relative magnitude and phase offset of the received signal at that frequency component on. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response (or "steady state"), for example, when no change or only small changes are detected in the channel response (or the complex value $Y_n$), indicates lack of movement. Thus, in some implementations, the complex value $Y_n$ for each of multiple devices in a wireless mesh network can be analyzed to detect whether motion has occurred, or whether there is lack of motion, in a space traversed by the transmitted signals f(t). In some cases, when lack of movement is detected, further analysis may be performed on the channel response to determine if an object is present in the space, but not moving.

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to the propagation characteristics of a channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some instances, the channel information (e.g., channel response information or beamforming state information, as described above) derived from wireless signals can be used to compute motion indicator values. For example, a set of motion indicator values for a given time frame may represent the levels of disturbance detected on the respective wireless links that communicated the wireless signals during the time frame. In some cases, the channel information can be filtered or otherwise modified, for instance, to reduce the effects of noise and interference on the motion indicator values. In some contexts, a higher magnitude motion indicator value may represent a higher level of disturbance, while a lower magnitude motion indicator value may represent a relatively lower level of disturbance. For instance, each motion indicator value can be an individual scalar quantity, and the motion indicator values can be normalized (e.g., to unity or otherwise).

In some cases, the motion indicator values associated with a time frame can be used collectively to make an overall determination, for example, whether motion occurred in the space during the time frame, where motion occurred in the space during the time frame, etc. For instance, a motion consensus value for a time frame may indicate the overall determination of whether motion occurred in the space based on all (or a subset) of motion indicator values for the time frame. In some cases, a more accurate, reliable or robust determination can be made by analyzing multiple motion indicator values for a time frame collectively. And in some cases, data sets can be updated recursively to further improve the accuracy, for example, of location determinations. For instance, the motion indicator values for each sequential time frame can be used to recursively update data sets representing the conditional probability of detecting motion at distinct locations in the space, and the recursively updated data sets can be used to make an overall determination of where motion occurred during a subsequent time frame.

Figure 3:
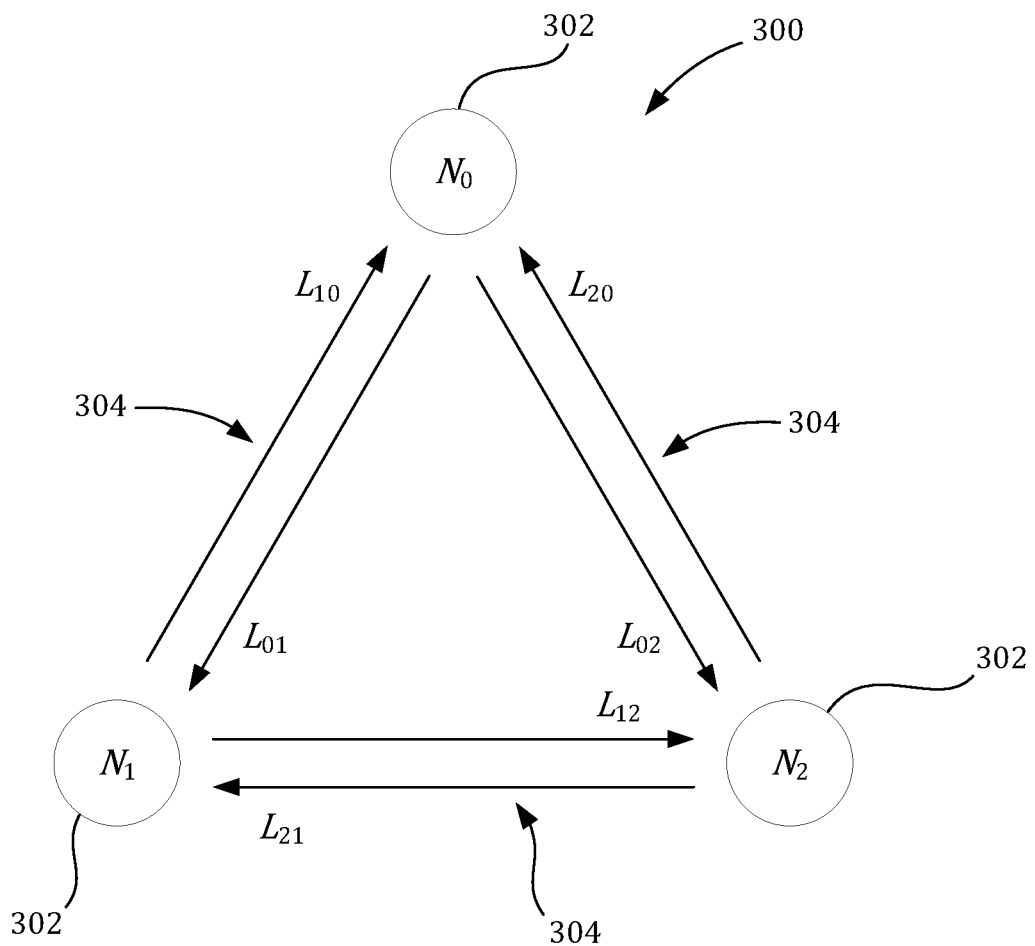
FIG. 3 is a schematic diagram of an example wireless communication network that includes a plurality of wireless nodes.

FIG. 3 is a schematic diagram of an example wireless communication network 300 that includes a plurality of wireless nodes 302. The plurality of wireless nodes 302 may be analogous to the wireless communication devices 102, 204 of FIGS. 1 and 2A-2B, respectively. In FIG. 3, three wireless nodes 302 are depicted, labeled $N_0$, $N_1$, and $N_2$. However, other numbers of wireless nodes 302 are possible in the wireless communication network 300. Moreover, other types of nodes are possible. For example, the wireless communication network 300 may include one or more network servers, network routers, network switches, network repeaters, or other type of networking or computing equipment.

The wireless communication network 300 includes wireless communication channels 304 communicatively coupling respective pairs of wireless nodes 302. Such communicative coupling may allow an exchange of wireless signals between wireless nodes 302 over a time frame. In particular, the wireless communication channels 304 allow bi-directional communication between the respective pairs of wireless nodes 302. Such communication may occur along two directions simultaneously (e.g., full duplex) or along only one direction at a time (e.g., half duplex). In some instances, such as shown in FIG. 3, the wireless communication channels 304 communicatively couple every pair of the plurality of wireless nodes 302. In other instances, one or more pairs of wireless nodes 302 may lack a corresponding wireless communication channel 304.

Each wireless communication channel 304 includes two or more wireless links, including at least one for each direction in the bi-directional communication. In FIG. 3, an arrow represents each individual wireless link. The arrow is labeled $L_{ij}$ where a first subscript, i, indicates a transmitting wireless node and a second subscript, j, indicates a receiving wireless node. For example, wireless nodes $N_0$ and $N_1$ are communicatively coupled by two wireless links that are indicated in FIG. 3 by two arrows, $L_{01}$ and $L_{10}$. Wireless link $L_{01}$ corresponds to wireless communication along a first direction from $N_0$ to $N_1$ and wireless link $L_{10}$ corresponds wireless communication along a second, opposing direction from $N_1$ to $N_0$.

In some implementations, the wireless communication network 300 obtains a set of motion indicator values associated with a time frame, which may include the processes of motion detection described in relation to FIGS. 2A-2B. The set of motion indicator values indicate motion detected from wireless links in a wireless communication network. Each motion indicator value is associated with a respective wireless link. The motion may be detected using one or more wireless links (e.g., one or more wireless links $L_{01}$, $L_{10}$, $L_{02}$, $L_{20}$, $L_{12}$, and $L_{21}$ of FIG. 3) in the wireless communication network (e.g., the wireless communication network 300). Each of the wireless links is defined between a respective pair of wireless communication devices in the wireless communication network (e.g., pair combinations of wireless nodes $N_0$, $N_1$, and $N_2$).

In some variations, the wireless communication network 300 may include a data processing apparatus that executes program instructions (e.g., a network server, a wireless communication device, a network router, etc.). The program instructions may cause the data processing apparatus to assign a unique node identifier to each of the wireless nodes 302 in the wireless communication network 300. The unique node identifier may be mapped to a media access control (MAC) address value, which corresponds to a MAC address (or portion thereof) associated with a wireless node. For example, the wireless nodes $N_0$, $N_1$, and $N_2$ of FIG. 3 may be associated with a six-character portion of their respective MAC addresses, which is then mapped to a unique node identifier:

$\{N_0, N_1, N_2\} \rightarrow \{7f4440, 7f4c9e, 7f630c\} \rightarrow \{0, 1, 2\}$ Here, the MAC address values of 7f4440, 7f4c9e, and 7f630c are mapped to respective unique node identifiers 0, 1, and 2. The program instructions may also cause the data processing apparatus to associate the wireless links with their respective pairs of wireless nodes via corresponding pairs of MAC address values. The MAC address values may then be mapped to a unique link identifier to form a link table. For example, the wireless links $L_{01}$, $L_{10}$, $L_{02}$, $L_{20}$, $L_{12}$, and $L_{21}$ of FIG. 3 may be mapped to unique link identifiers according to:

$$\begin{Bmatrix} L_{01} \\ L_{02} \\ L_{10} \\ L_{12} \\ L_{20} \\ L_{21} \end{Bmatrix} \rightarrow \begin{Bmatrix} 7f4440 \rightarrow 7f4c9e \\ 7f4440 \rightarrow 7f630c \\ 7f4c9e \rightarrow 7f4440 \\ 7f4c9e \rightarrow 7f630c \\ 7f630c \rightarrow 7f4440 \\ 7f630c \rightarrow 7f4c9e \end{Bmatrix} \rightarrow \begin{Bmatrix} 0 \\ 1 \\ 2 \\ 3 \\ 4 \\ 5 \end{Bmatrix}$$

The MAC address values may be ordered, from left to right, to indicate respective pairs of transmitting and receiving wireless nodes in a wireless link. In particular, the left MAC address value may correspond to a transmitting wireless node and the right MAC address value may correspond to a receiving wireless node. Such mappings of unique node and link identifiers may aid the data processing apparatus in performing operations, such as searching, sorting, and matrix manipulation, during processes of motion detection.

The program instructions may additionally cause the data processing apparatus to poll the wireless links (or wireless nodes 302) to obtain motion indicator values for each wireless link in the plurality of wireless links. For example, the wireless links of the wireless communication network 300 of FIG. 3 may report motion indicator values according to a data structure, such as shown below:

$$\begin{Bmatrix} 0 & 0.00 \\ 1 & 0.00 \\ 2 & 0.71 \\ 3 & 1.07 \\ 4 & 1.15 \\ 5 & 1.30 \end{Bmatrix}$$

In the data structure, the first column corresponds to the unique link identifiers of the wireless links and the second column of the data structure corresponds to their respective motion indicator values. The data structure may be an array, as shown above, or some other type of data structure (e.g., a vector). Although data structure is presented as having three significant digits for each motion indicator value, other numbers of significant digits are possible for the motion indicator values (e.g., 2, 5, 9, etc.).

Figure 4:
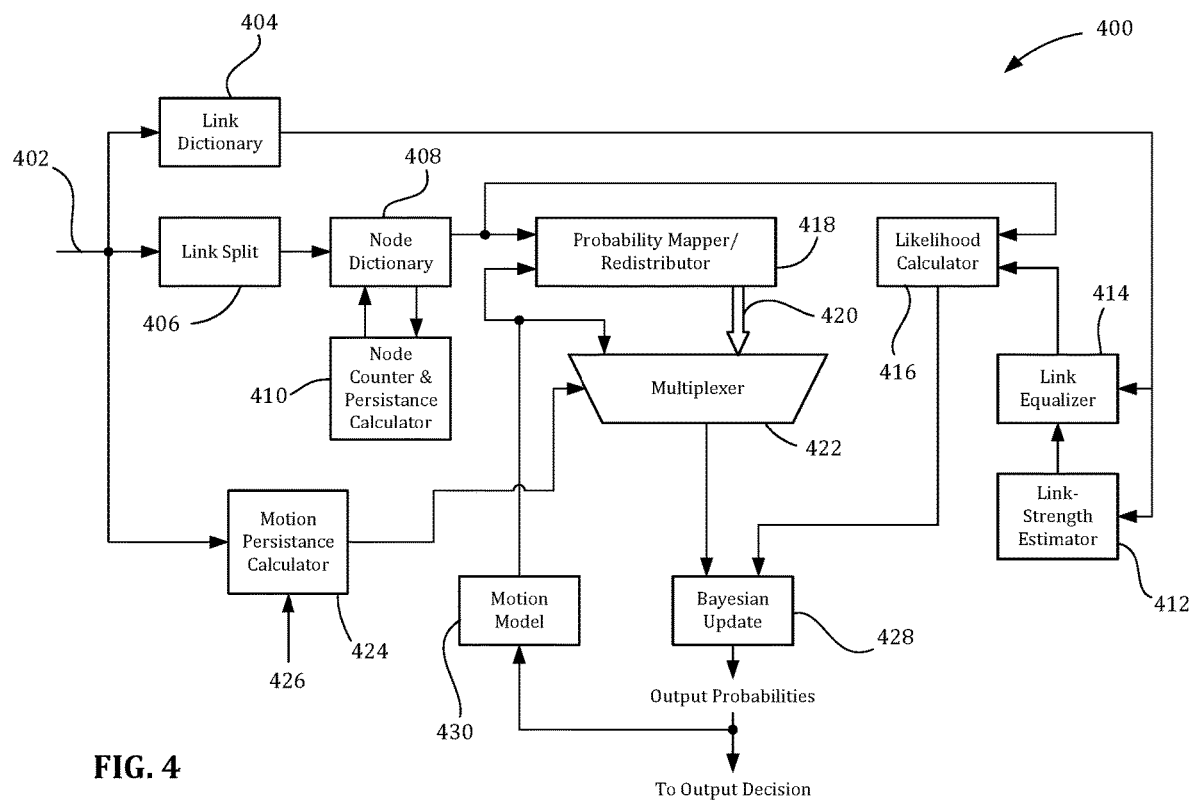
FIG. 4 is a flowchart of an example process for determining a location of motion detected by one or more wireless links in a wireless communication network.

Now referring to FIG. 4, a flowchart 400 is presented of an example process for determining a location of motion detected by one or more wireless links in a wireless communication network. The one or more wireless links may be part of a plurality of wireless links defined by respective pairs of wireless nodes, such as the wireless nodes 302 of FIG. 3. The wireless communication network may include a data processing apparatus (e.g., one or more of the wireless nodes may serve as the data processing apparatus). Alternatively, the data processing apparatus may be communicatively-coupled to the wireless communication network through a data connection (e.g., a wireless connection, a copper-wired connection, a fiber optic connection, etc.). The data processing apparatus may receive a data structure associated with a time frame, as shown by line 402. The data structure 402 may map the plurality of wireless links with their respective motion indicator values for the time frame. The plurality of wireless links may be represented by unique link identifiers in the data structure 402. However, other representations are possible. For example, the plurality of wireless links may be represented by respective pairs of unique node identifiers. In some instances, the data structure 402 may associate each of the unique link identifiers with a corresponding pair of unique node identifiers.

The data processing apparatus executes program instructions to generate, from the data structure 402, wireless links that are present in the wireless communication network during the time frame. The generated wireless links and their respective motion indicator values may be stored in a first memory of the data processing apparatus (or motion detection system) that serves as a link dictionary. The link dictionary is shown by block 404 of FIG. 4. The link dictionary 404 is operable to track wireless links present in the wireless communication network over successive time frames. For example, when a new wireless link is observed in the wireless communication network, the data processing apparatus updates the link dictionary 404 to include the new wireless link. In another example, when an existing wireless link is no longer observed in the wireless communication network, the data processing apparatus updates the link dictionary 404 to remove the (prior) existing wireless link. Wireless links may be represented in the link dictionary 404 by unique link identifiers, respective pairs of unique node identifiers, or both. However, other representations are possible.

The data processing apparatus also executes program instructions to generate, from the data structure, wireless nodes present in the wireless communication network during the time frame. In particular, the program instructions direct the data processing apparatus to "split" each generated wireless link into individual wireless nodes of its respective pair of wireless nodes, as shown in block 406. The program instructions also direct the data processing apparatus to sort or filter through the individual wireless nodes to identify unique wireless nodes in the wireless communication network during the time frame. Given that a single wireless node may be shared in common between two or more wireless links, the link dictionary 404 alone may not be sufficient in establishing unique wireless nodes of the wireless communication network. The unique wireless nodes may then be stored in a second memory of the data processing apparatus (or motion detection system) that serves as a node dictionary. The node dictionary is shown by block 408 of FIG. 4. The node dictionary 408 is operable to maintain a list of unique wireless nodes present in the wireless communication network over successive time frames. The unique wireless nodes may be represented in the node dictionary 408 by respective unique node identifiers. However, other representations are possible.

A node counter and persistence calculator may be communicatively-coupled to the node dictionary, as shown by block 410. In many instances, the node counter and persistence calculator 410 is part of the data processing apparatus. The node counter and persistence calculator 410 is operable to track wireless nodes present in the wireless communication network over successive time frames and update the node dictionary 408 accordingly. Such tracking may include timing an appearance (or disappearance) of one or more wireless nodes. For example, when a new wireless node connects to the wireless communication network, the node counter and persistence calculator 410 updates the node dictionary 408 to include the new wireless node. In another example, when a wireless node disconnects from the wireless communication network, the node counter and persistence calculator 410 updates the node dictionary 408 to remove the disconnected wireless node. Such updating may occur after a predetermined number of time frames have elapsed where the wireless node is not connected to the wireless communication network.

The data processing apparatus additionally executes program instructions to alter one or more magnitudes of the set of motion indicator values to reference each motion indicator value to a common scale of wireless link sensitivity. More specifically, the data processing apparatus may function, in part, as a link strength estimator, such as shown by block 412, and a link equalizer, such as shown by block 414. The link strength estimator 412 and the link equalizer 414 receive, from the link dictionary 404, an identity of wireless links that are present in the wireless communication network during the time frame as well as their respective motion indicator values. The link equalizer 414 also receives, from the link strength estimator 412, an equalization value for each of the identified wireless links. The link strength estimator 412 and the link equalizer 414 operate cooperatively to reference the motion indicator values of each identified wireless links to a common scale of wireless link sensitivity.

In operation, the link strength estimator 412 estimates a link strength of the identified wireless links by determining a statistical property of their respective motion indicator values. The statistical property may be a maximum motion indicator value, a deviation of a motion indicator value from a mean value, or a standard deviation. Other statistical properties are possible. In some instances, the link strength estimator 412 tracks the statistical properties of one or more respective motion indicator values over successive time frames. The statistical property may allow the link strength estimator 412 to gauge an excitation strength and corresponding dynamic range of a wireless link. Such gauging may account for a unique sensitivity of each identified wireless link. The link strength estimator 412 passes the determined statistical values to the link equalizer 414, which in turn, utilizes them as equalization values for respective motion indicator values. In particular, the link equalizer 414 divides the motion indicator value of each identified wireless link with its respective equalization value (or statistical property) to generate a normalized motion indicator value. In this manner, the link equalizer 414 "equalizes" the identified wireless links so that their respective responses to motion or other events may be compared independent of sensitivity.

For example, due to motion or another event, a first subset of wireless links may become strongly excited and exhibit correspondingly high dynamic ranges (or sensitivities). A second subset of wireless links may become weakly excited and exhibit correspondingly low dynamic ranges (or sensitivities) due to the same motion or event. Such excitations and corresponding dynamic ranges are reflected in the motion indicator values received by the link strength estimator 412 and the link equalizer 414 from the link dictionary 404. However, the link strength estimator 412 and link equalizer 414 operate cooperative to normalize the received motion indicator values to a common scale of wireless link sensitivity. Such normalization ensures that comparisons of the first and second sets of wireless links within the plurality of wireless links do not overweight the first set of wireless links relative to the second set. Other benefits are normalization are possible.

The program instructions may further cause the data processing apparatus to identify a subset of wireless links based on a magnitude of their associated motion indicator values relative to the other motion indicator values in the set of motion indicator values. In particular, the data processing apparatus may receive the identified wireless links and their respective normalized motion indicator values from the link equalizer 414 and store this data in a memory associated with a likelihood calculator, such as shown by block 416. As part of this operation, the data processing apparatus may also receive the list of unique wireless nodes from the node dictionary 408 and store the list in the memory associated with the likelihood calculator 416. The data processing apparatus may function, in part, as the likelihood calculator 416.

The likelihood calculator 416 identifies a subset of wireless links based on a magnitude of their respective, normalized motion indicator values relative to other normalized motion indicator values. To do so, the likelihood calculator 416 may sort or filter through the normalized motion indicator values received from the link equalizer 414 to identify the subset of wireless links. For example, the link calculator 416 may sort the data structure according to magnitude to determine a highest normalized motion indicator value, thereby generating a subset of wireless with a single wireless link. In another example, the link calculator 416 may sort the data structure according to magnitude to determine the three highest normalized motion indicator values, thereby generating a subset of wireless with three wireless links. Other numbers of wireless links are possible for the subset of wireless links.

The link calculator 416 also generates count values for the wireless nodes connected to the wireless communication network during the time frame. The count value for each wireless node indicates how many wireless links in the subset of wireless links are defined by the wireless node. For example, and with reference to FIG. 3, the link calculator 416 may identify a subset of wireless links based on the three highest normalized motion indicator values:

$$\begin{Bmatrix} 0 & 0.00 \\ 1 & 0.00 \\ 2 & 0.24 \\ 3 & 0.36 \\ 4 & 0.40 \\ 5 & 0.65 \end{Bmatrix} \rightarrow \begin{Bmatrix} 3 & 0.36 \\ 4 & 0.40 \\ 5 & 0.65 \end{Bmatrix}$$

The unique link identifiers of 3, 4, and 5 correspond to wireless nodes $N_0$, $N_1$, and $N_2$ as shown below:

$$\begin{Bmatrix} 3 & 0.36 \\ 4 & 0.40 \\ 5 & 0.65 \end{Bmatrix} \rightarrow \begin{Bmatrix} 7f4c9e \rightarrow 7f630c & 0.36 \\ 7f630c \rightarrow 7f4440 & 0.40 \\ 7f630c \rightarrow 7f4c9e & 0.65 \end{Bmatrix} \rightarrow \begin{Bmatrix} N_1 \rightarrow N_2 & 0.36 \\ N_2 \rightarrow N_0 & 0.40 \\ N_2 \rightarrow N_1 & 0.65 \end{Bmatrix}$$

Here, wireless node $N_0$ assists in defining one wireless link in the subset of wireless links, i.e., $N_2 \rightarrow N_0$. Similarly, wireless node $N_1$ assists in defining two wireless links in the subset of wireless links, i.e., $N_1 \rightarrow N_2$ and $N_2 \rightarrow N_1$, and wireless node $N_2$ assists in defining three wireless links in the subset of wireless links, i.e., $N_1 \rightarrow N_2$, $N_2 \rightarrow N_0$, and $N_2 \rightarrow N_1$. Accordingly, the link calculator 416 generates count values of 1, 2, and 3 for respective wireless nodes $N_0$, $N_1$, and $N_2$. In the present example, all wireless nodes of the wireless communication network assist in defining a wireless link of the subset of wireless links. However, for wireless nodes that do not assist in defining a wireless link of the subset of wireless links, the link calculator 416 may generate a count value of zero. In some instances, the link calculator 416 generates a count-value data structure associating each wireless node connected to the wireless communication network during the time frame with its respective count value. For the present example, the link calculator 416 may generate the following the count-value data structure:

$$\left\{ \begin{matrix} N_0 & 1 \\ N_1 & 2 \\ N_2 & 3 \end{matrix} \right\}$$

Although wireless nodes in the count-value data structure are represented by the label, $N_i$, where i represents a number of a wireless node, other representations are possible (e.g., pairs of partial MAC addresses).

The link calculator 416 further generates a probability vector based on the count values that includes values for each wireless node connected to the wireless communication network during the time frame. The values for each connected wireless node represent a probability of motion at the connected wireless node during the time frame. In particular, the values may represent a probability that motion at (or proximate to) a respective wireless node induces link activity along a particular wireless link. In some instances, the values sum to unity. In these instances, the values may be probability values. The link calculator 416 passes the generated probability vector to a Bayesian update engine, as shown in FIG. 4.

In some instances, the values for each connected wireless node are likelihood values assigned from a link likelihood map. The likelihood values may not necessary sum to unity. The link likelihood map associates likelihood values with respective magnitudes of count values. The likelihood values and their associations may be predetermined and may further be stored in a memory of the link calculator 416 (or data processing apparatus). For example, if a wireless node is strongly represented in a subset of wireless links, motion detected by the wireless communication network will have a relatively high probability of being located at or near the wireless node. As such, the link likelihood map may associate high likelihood values with proportionately high count values. However, other associations of likelihood values and count values are possible.

In some variations, the probability vector is represented by a probability vector, $P(L_j|N_i)$, that includes probability values based on the link likelihood map. The probability values correspond to probabilities that a wireless link, $L_j$, exhibits link activity given motion at a wireless node, $N_i$. For example, and with reference to FIG. 3, the link calculator 416 may generate a subset of wireless links that includes only wireless link $L_{02}$, which has a unique link identifier of "1". As such, $P(L_j|N_i)=P(1|N_i)=\{P(1|0), P(1|1), P(1|2)\}$. Here, $P(1|0)$ corresponds to the probability that motion at wireless node 0 induces link activity along wireless link 1, $P(1|1)$ corresponds to the probability that motion at wireless node 1 induces link activity along wireless link 1, and $P(1|2)$ corresponds to the probability that motion at wireless node 2 induces link activity along wireless link 1. These probability values can be generated from likelihood values of the link likelihood map. For example, the link calculator 416 may assign wireless nodes 0, 1, and 2 each a likelihood value based on a respective count value. The link calculator 416 may then normalize the assigned likelihood values to unity, thereby generating corresponding probability values for each wireless node.

Figure 5A:
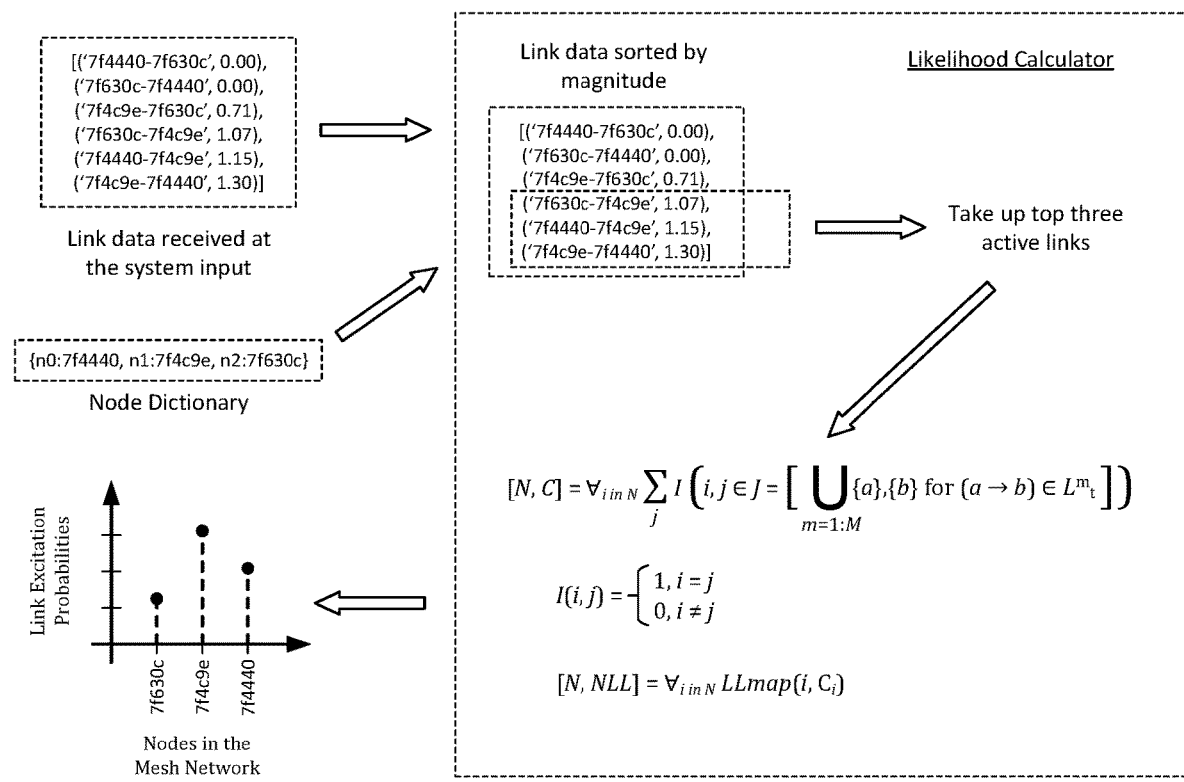
FIG. 5A is a flowchart of an example process in which a link calculator generates a probability vector based on multiple wireless links.

FIG. 5A presents a flowchart of an example process in which a link calculator generates a probability vector based on multiple wireless links. FIG. 5A depicts the link calculator taking three wireless links into account. However, other numbers of wireless links are possible. To take multiple wireless links into account, the link calculator relies on motion indicator values in addition to the highest motion indicator value. This process makes intuitive sense. If a disturbance happens near a wireless node, the disturbance is likely to affect all wireless links associated with that wireless node. The link calculator may take up all the excited wireless links and examine a frequency of occurrence of a particular wireless node amongst the excited wireless links. In this instance, motion is most likely to be happening at the most common wireless node. The likelihood calculator takes the M top excited wireless links (e.g., M=3), and passes them through a mathematical function. The mathematical function splits each wireless link to create a set of tuples, then determines the frequency of each wireless node in the given set of tuples. The mathematical function also maps the resulting frequency of each wireless node to likelihood through a link likelihood map. The probability vector is then output for Bayesian update engine.

FIG. 5B presents an example mathematical function for generating a probability vector using a likelihood calculator. FIG. 5B shows the multi-link likelihood process utilized by the likelihood calculator in FIG. 5A, and splits and explains the example mathematical function in greater detail. A wireless link from a certain time instant is referred to as $L_t$ and the wireless link number in terms of excitation rank is given by m. The likelihood calculator takes up M excited wireless links from a wireless link vector and uses one wireless link, denoted as (a→b), to create a set of nodes {a} and {b} and perform a union of this set over all the M excited wireless links. Variable j then sweeps over this union by taking in each element and comparing it with a given element denoted by i where i is being swept across the node dictionary. This comparison yields a one or a zero, which are summed together for all values of j in the dictionary. The summation yields a count for each wireless node present in the wireless communication network. An LLmap function receives a certain node and its respective count, and in response, outputs a likelihood value for every count. The higher the count, the higher is the likelihood for motion at a wireless node.

Now referring back to FIG. 4, the data processing apparatus also executes program instructions to pass, from the node dictionary 408 to a probability mapper/redistributor, the list of unique wireless nodes present in the wireless communication network during the time frame. The data processing apparatus may function, in part, as a probability mapper/redistributor, such as shown by block 418. As part of this operation, the data processing apparatus may receive a probability vector generated prior to the time frame, e.g., a prior probability vector. The probability mapper/redistributor 418 is operable to determine a change in wireless connectivity between time frames, such as between a prior time frame and a subsequent time frame. The change in wireless connectivity may include one or both of: [1] wireless nodes that have connected to the wireless communication network between the prior and subsequent time frames, or [2] wireless nodes that have disconnected from the wireless communication network between the prior and subsequent time frames. To determine the change in wireless connectivity, the probability mapper/redistributor 418 may compare the list of unique wireless nodes in the time frame to wireless nodes represented in the probability vector generated prior to the time frame.

The probability mapper/redistributor 418 is also operable to generate an initialization probability vector of a plurality of initialization probability vectors 420 by altering values of the prior probability vector based on the change in wireless connectivity. For example, the change in wireless connectivity may include a wireless node that has disconnected from the wireless communication network between the prior and subsequent time frames. In this case, the probability mapper/redistributor 418 may generate the initialization probability vector by apportioning values of the prior probability vector associated with the disconnected wireless node to values of wireless nodes that have remained connected to the wireless communication network. Such apportioning may occur in ratios defined by the values of the remaining wireless nodes. However, other apportioning schedules are possible. In another example, the change in wireless connectivity may include a wireless node that has connected from the wireless communication network between the prior and subsequent time frames. In this case, the probability mapper/redistributor 418 generate the initialization probability vector by adding a value to the prior probability vector for the newly-connected wireless node.

The probability mapper/redistributor 418 may be operable to generate other types of initialization probability vectors that correspond to reset states. For example, if the wireless communication network (or motion detection system) is cold-started, the probability mapper/redistributor 418 may generate an initialization probability vector by assigning equal probability values to all unique wireless nodes listed in the node dictionary 408. In another example, if the wireless communication network (or motion detection system) is warm-started, the probability mapper/redistributor 418 may generate an initialization probability vector based on probability values that correspond to a time frame when motion was last detected. In yet another example, if the wireless communication network (or motion detection system) is operational but later reset, the probability mapper/redistributor 418 may utilize the prior probability vector as the initialization probability vector. In yet another example, if a user notifies the wireless communication network (or motion detection system) that he/she is leaving a monitored residence (e.g., through a mobile software application), the probability mapper/redistributor 418 may generate an initialization probability vector with probability values biased towards wireless nodes at a point of entry (e.g., a front door).

The probability mapper/redistributor 418 passes the plurality of initialization probability vectors 420 to a multiplexor (or mux), which also receives the prior probability vector from a motion model. The data processing apparatus may function, in part, as the multiplexor, such as shown by block 422. The multiplexor 422 is operable to select the prior probability vector or one of the plurality of initialization probability vectors based on the set of motion indicator values, a configuration of the wireless communication network, or both. The selected probability vector is then passed to the Bayesian update engine, as shown in FIG. 4. In order to determine which probability vector to select, the multiplexor 422 receives a control input from a motion persistence calculator, as shown by block 424. The motion persistence calculator 424 receives the data structure 422, which includes the set of motion indicator values, and also receives a configuration of the wireless communication network 426. Based on these inputs, the motion persistence calculator 424 generates the control signal, which when received by the multiplexor 422, selects which of the prior probability vector or one of the plurality of initialization probability vectors is passed to the Bayesian update engine. If motion is continuously detected by the wireless communication network (or motion detection system), the motion persistence calculator 424 may keep passing a prior probability vector through the multiplexor 422. In contrast, if motion is detected after a period of absence, the motion persistence calculator 424 may pass an initialization probability vector through the multiplexor 422 that corresponds to a reset state. The data processing apparatus may also function, in part, as the motion persistence calculator 424.

In some implementations, the data processing apparatus uses the selected probability vector and a set of motion indicator values associated with a second subsequent time frame to identify a location associated with motion that occurred during the subsequent time frame. In particular, executes program instructions to generate, from a first probability vector received from the likelihood calculator 416 and a second probability vector received from the multiplexor 422, a third probability vector that includes third values for each wireless node. In particular, the Bayesian update engine generates the third probability vector, as shown by block 428. The third values of the third probability vector represent probabilities of motion at the respective wireless nodes during the time frame.

In some variations, the second probability vector is represented by a probability vector, $P(N_i)$, that includes probability values (or second values) representing a probability of motion at a wireless node, $N_i$. The probability of motion at wireless node, $N_i$, for $P(N_i)$ is independent of link activity along any of wireless links, $L_j$, and may also be independent of other factors. For example, and with reference to FIG. 3, the program instructions may cause the data processing apparatus to define $P(N_i)$ according to $P(N_i)=\{P(0), P(1), P(2)\}$. Here, $P(N_i)$ has probability values of $P(0)$, $P(1)$, and $P(2)$, which correspond to the probability of motion at (or proximate to) wireless nodes 0, 1, and 2, respectively.

In some variations, the third probability vector is represented by $P(N_i|L_j)$, where $N_i$ corresponds to the unique node identifier and $L_j$ corresponds to the unique link identifier. The third probability vector, $P(N_i|L_j)$, includes third values that represent a probability of motion at wireless node, $N_i$, given link activity along wireless link, $L_j$. For example, if $L_j$ corresponds to wireless link 1 in the wireless communication network 300 of FIG. 3, the respective third values may then be represented by $P(0|1)$, $P(1|1)$, and $P(2|1)$, where $P(N_i|1)=\{P(0|1), P(1|1), P(2|1)\}$. Here, $P(0|1)$ corresponds to a probability that link activity along wireless link 1 results from motion at wireless node 0, $P(1|1)$ corresponds to a probability that link activity along wireless link 1 results from motion at wireless node 1, and $P(2|1)$ corresponds to a probability that link activity along wireless link 1 results from motion at wireless node 2.

The third probability vector, $P(N_i|L_j)$, may be determined by the Bayesian update engine 428 according to Eq. (1):

$$P(N_i | L_j) = \frac{P(L_j | N_i) \cdot P(N_i)}{\sum_i P(L_j | N_i) P(N_i)} \quad (1)$$

where $P(L_j|N_i)$ and $P(N_i)$ are as described above for, respectively, the first probability vector from the likelihood calculator 416 and the second probability vector from the multiplexor 422. Eq. (1) may allow the wireless communication network 300 (or data processing apparatus) to determine the location of detected motion using Bayesian statistics. For example, if in the wireless communication network 300 of FIG. 3, the subset of wireless links includes only wireless link 1 and $P(1|N_i)=\{1, 0.2, 0.9\}$ based on the link likelihood map, the program instructions may then cause the data processing apparatus to calculate the third probability vector, $P(N_i|1)$, according to:

$$P(N_i | 1) = \frac{P(1 | N_i) \cdot P(N_i)}{\sum_i P(1 | N_i) P(N_i)} = \frac{\{1.0 \cdot 0.333, 0.2 \cdot 0.333, 0.9 \cdot 0.333\}}{(1.0 \cdot 0.333) + (0.2 \cdot 0.333) + (0.9 \cdot 0.333)}$$

Such calculation results in $P(N_i|1)=\{0.476, 0.095, 0.429\}$, with the third values summing to unity, i.e., 0.476+0.095+0.429=1. $P(N_i|1)$ may therefore represent a probability distribution normalized to unity. In $P(N_i|1)$, $P(0|1)$ corresponds to the largest of the third values, indicating that motion detected by the wireless communication network 300 along wireless link 1 has the highest probability of being located at (or proximate to) wireless node 0. Based on this value of $P(0|1)$, the program instructions may cause the data processing apparatus to look up the MAC address value of wireless node 0, and when found, output the result (e.g., output 7f4440).

In some implementations, the data processing apparatus performs an iterative process for sequential time frames. For example, the data processing apparatus may repeat the operations, over multiple iterations for respective time frames, of obtaining the set of motion indicator values associated with a subsequent time frame, identifying the subset of wireless links based on a magnitude of their associated motion indicator values relative to other motion indicator values in the set of motion indicator values, generating the count values for the wireless nodes connected to the wireless communication network during the subsequent time frame, generating the first probability vector based on the count values and including values for the connected wireless nodes. In some implementations, the repeated operations include obtaining a set of motion indicator values associated with a prior time frame, generating a prior probability vector associated with the prior time frame, generating a second probability vector by selecting the prior probability vector or one of the plurality of initialization probability vectors to.

In some implementations, the repeated operations may include generating a third probability vector based on the first values of the first probability vector and the second values of the second probability vector; identifying a wireless communication device associated with the highest of the third values; and identifying, by operation of a data processing apparatus, a location associated with the identified wireless communication device as a location of the motion detected from the wireless signals exchanged during the subsequent time frame.

An output of the Bayesian update engine 428 may be fed into the motion model to generate the prior probability vector (or second probability vector), which is passed to the probability mapper/redistributor 418 and the multiplexor 422. The data processing apparatus may function, in part, as the motion model, as shown by block 430. The motion model 430 may operate analogous to calculating probabilities on a trellis. FIG. 5 presents a schematic diagram of an example motion model using a trellis representation for three wireless nodes. At every time instant t, motion may exist at any of the available wireless nodes. From time t to time t+1—shown in FIG. 5 as $t_1$ and $t_2$, respectively—motion can either remain at the same wireless node, or transition to any of the other wireless nodes. In order to determine motion at time step t+1, the probabilities of motion existing on any of the wireless nodes in time step t are aggregated, which may include a matrix vector calculation. Probabilities that motion now happens at $n_1$ in time step t+1 is given by the possibilities of motion happening at $n_1$ in the past and staying at $n_1$, happening at $n_2$ in the past and moving to $n_1$, or happening at $n_3$ in the past and moving to $n_1$. In other words, the motion at $n_1$ at time step t+1 can be represented by a dot product. The entire operation for all three nodes at any time can be represented by a matrix vector calculation as shown. Each entry of the matrix is a transition probability of motion, transitioning from happening at $N_x$ to $N_y$.

Figure 6:
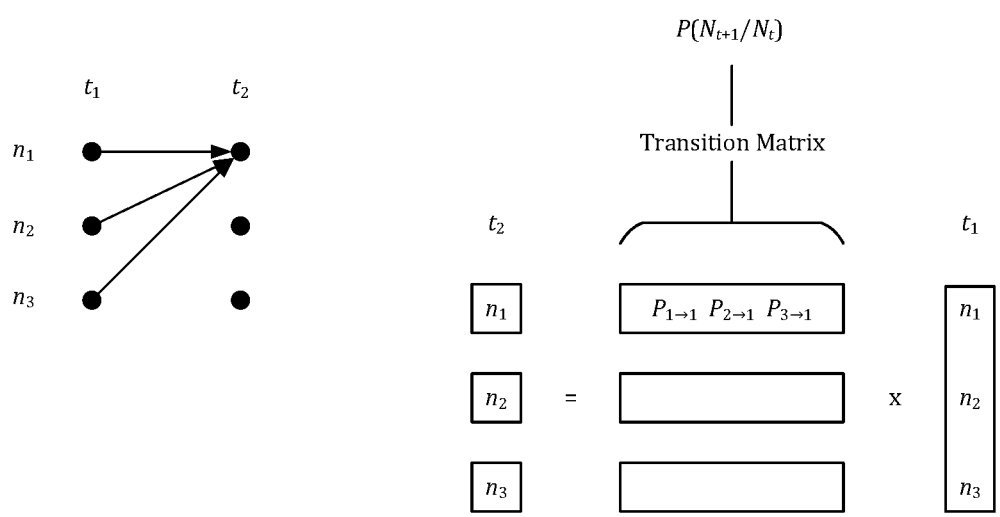
FIG. 6 is a schematic diagram of an example motion model using a trellis representation for three wireless nodes.
Figure 7:
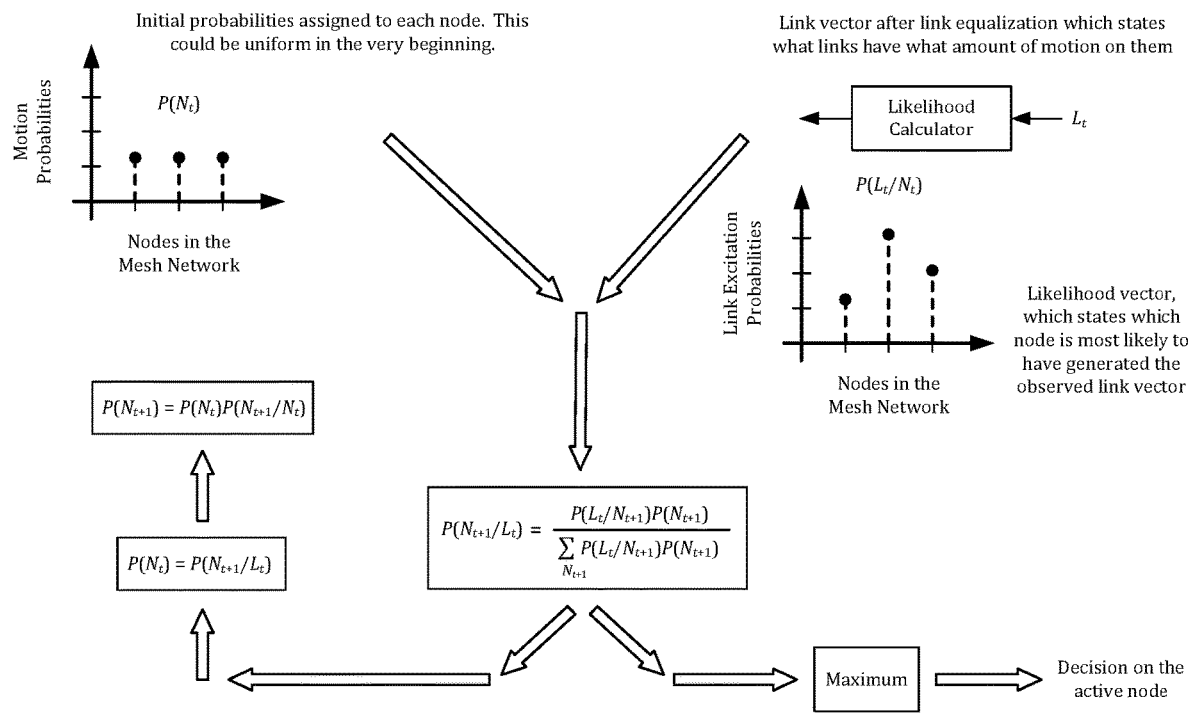
FIG. 7 is a schematic diagram of an example flow of probabilities in determining a location of motion detected by three wireless links in a wireless communication network.

FIG. 6 presents a schematic diagram of an example flow of probabilities in determining a location of motion detected by three wireless links in a wireless communication network. On the leftmost side is an initial probability vector which assigns equal probabilities of motion to all wireless nodes in the wireless communication network. In the graph inset in the upper left, each pulse on the axis is to be read as a probability of motion happening at node $N_x$ on the x-axis. On the rightmost side, motion indicator values are received, which specifying an amount of excitation on a wireless link. These values are converted into a likelihood function, which determines how likely each wireless node is to have triggered an observed link behavior. In the graph inset in the middle right, a link-excitation likelihood graph presents a plot of a likelihood vector over the x-axis and for all possible wireless nodes. Using Bayesian formulation, the likelihood vector and the initial probability vector are multiplied and a resulting product is divided by a normalizing constant obtained by performing marginalization over all wireless nodes. This calculation provides a probability of motion at a wireless node given the link information at time step t+1. This probability is used to form a decision on where the motion is most likely to be happening. The output probabilities are assigned to anode-motion probability vector as new probabilities, and then propagated through the motion model, in preparation for the next iteration of the loop. The job of the motion model is to propagate these probabilities into the next time step, based on the information of what is a transition probability of making a transition from $N_x$ to $N_y$ at any time instant.

Now referring back to FIG. 3, the wireless communication network 300 may determine a location of motion detected by the wireless links by accounting for potential transitions of the motion from one wireless node 302 to another. The potential transitions of the motion may also include those remaining at, or in the immediate vicinity of, a wireless node 302. For example, the wireless communication network 300 may detect motion at or near a first wireless node disposed in a bedroom of a house. The wireless communication network 300 may account for a transition towards a second wireless node in a kitchen of the house if a corresponding time period of detection is during an eating time (e.g., breakfast, lunch, etc.). In another example, if the wireless communication network 300 detects motion at or near the second wireless node during the eating time, wireless communication network 300 may account for the detected motion remaining at or near the second wireless nodes for a future time period within the eating time. Other criteria for the potential transitions are possible.

In some instances, potential transitions of detected motion include criteria of time, location, or both. For example, if a time period of detection occurs during night time, a probability of detected motion transitioning from a bedroom to a washroom may be high. In contrast, a probability of the detected motion transitioning to a front door may be low. A transition probability matrix may be used to represent these differences, which are based predominantly on time: The transition probability matrix may assign a high transition probability to the detected motion transitioning from the bedroom to the washroom while assigning a low transition probability to the detection motion transitioning from the bedroom to the front door. The transition probability matrix may also account for a location of the detected motion. For example, motion detected in a living room may have a similar probability of transitioning to any another wireless node. This similar probability may incorporate considerations of time (e.g., night time, day time, etc.).

Figure 8:
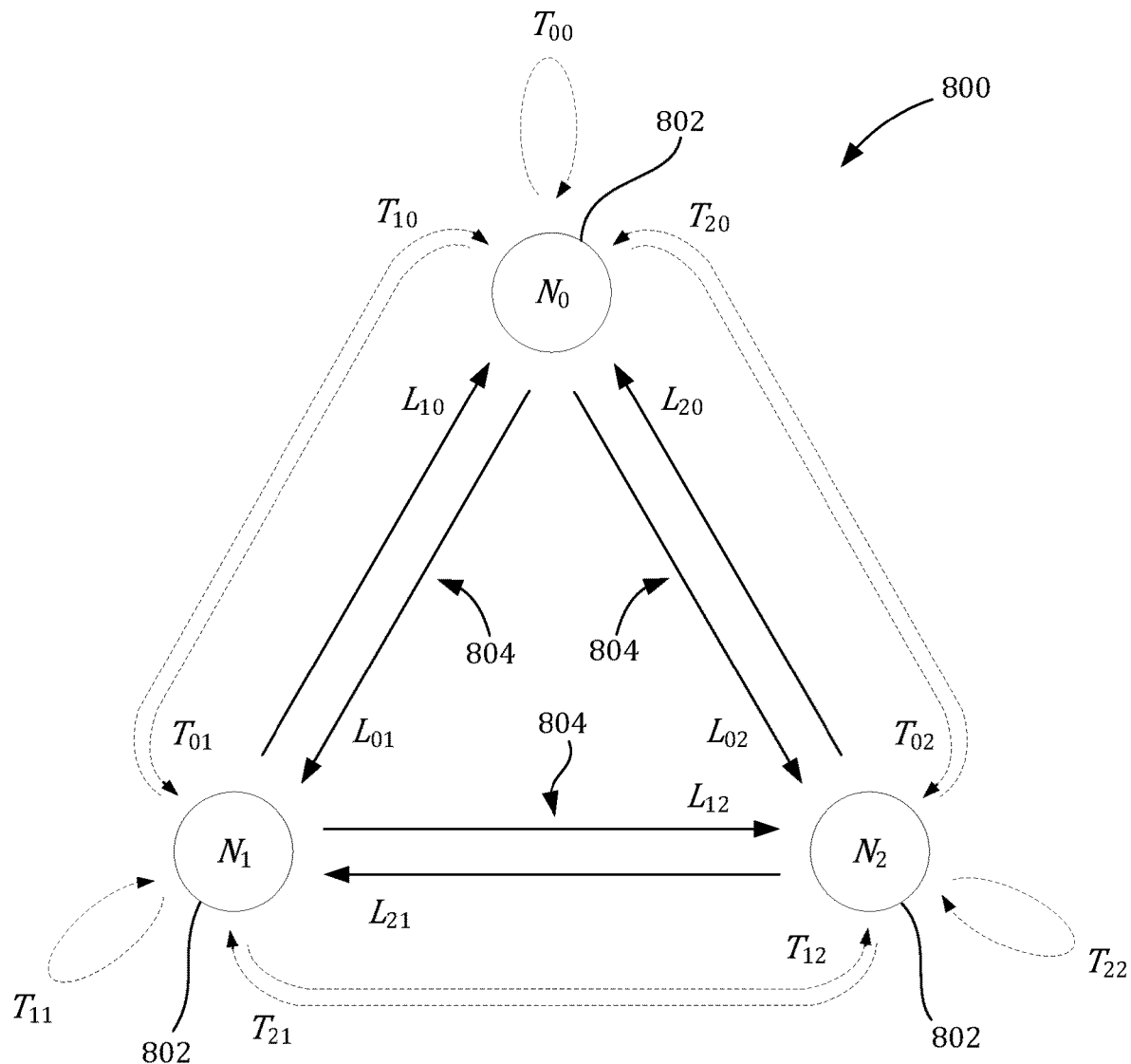
FIG. 8 is a schematic diagram of an example wireless communication network in which dashed arrows indicate potential transitions of detected motion between wireless nodes.

FIG. 8 is a schematic diagram of a wireless communication network 800 in which dashed arrows indicate potential transitions of detected motion between wireless nodes 802. The wireless communication network 800 of FIG. 8 may be analogous to the wireless communication network of FIG. 3. Features common to FIG. 3 and FIG. 8 are related via coordinated numerals that differ in increment by five hundred. In FIG. 8, dashed arrows represent each potential transition for detected motion between wireless nodes 802 of the wireless communication network 800. The dashed arrows are labeled $T_{ij}$ where a first subscript, i, indicates an originating location and a second subscript, j, indicates a destination location. For example, wireless nodes $N_0$ and $N_1$ may each serve as an originating location and a destination location depending on a particular transition. Transition $T_{01}$ corresponds to the detected motion transitioning from $N_0$ to $N_1$ and transition $T_{10}$ to the detected motion transitioning from $N_1$ to $N_0$.

In some implementations, a node in the wireless communication network 800 obtains a transition probability matrix that includes transition values and non-transition values. The transition values may represent probabilities of motion transitioning between locations associated with distinct wireless communication devices, and the non-transition values representing probabilities of motion remaining within locations associated with the respective wireless communication devices.

In some variations, the transition probability matrix is represented by $T(N_i^t|M_i^{t-1})$ where $M_i^{t-1}$ corresponds to the unique node identifier at which motion was detected during a prior time frame (t−1) and $N_i^t$ corresponds to the unique node identifier to which the detected motion has moved in a subsequent time frame (t). The transition probability matrix, $T(N_i^t|M_i^{t-1})$, includes probability values, $T(N_i^t|M_i^{t-1})$, that can represent either a transition probability value or a non-transition probability value. For example, the transition probability matrix, $T(N_i^t|M_i^{t-1})$, may be expanded according to Eq. (2):

$$T(N_i^t \mid M_i^{t-1}) = \begin{Bmatrix} T(0^t \mid 0^{t-1}) & \cdots & T(0^t \mid M_i^{t-1}) \\ \vdots & \ddots & \vdots \\ T(N_i^t \mid 0^{t-1}) & \cdots & T(N_i^t \mid M_i^{t-1}) \end{Bmatrix} \quad (2)$$

Here, the diagonal terms of transition probability matrix, $T(N_i^t|M_i^{t-1})$, correspond to $N_i^t=M_i^{t-1}$ and the non-diagonal terms correspond to $N_i^t \neq M_i^{t-1}$. The diagonal terms may represent probabilities of transitioning between (or remaining at) the same wireless communication device during the subsequent time frame, e.g., $T(0^t|0^{t-1})$, $T(1^t|1^{t-1})$, $T(2^t|2^{t-1})$, and so forth. As such, the diagonal terms may represent non-transition probability values (or non-transition values). Similarly, the off-diagonal terms represent probabilities of transitioning from one wireless communication device to another during the subsequent time frame, e.g., $T(0^t|2^{t-1})$, $T(3^t|0^{t-1})$, $T(1^t|8^{t-1})$, and so forth. As such, the off-diagonal terms may correspond to transition probability values (or transition values).

For the wireless communication network 800 of FIG. 8, potential transitions $T_{00}$, $T_{11}$, and $T_{22}$ may be represented by respective non-transition probability values $T(0^t|0^{t-1})$, $T(1^t|1^{t-1})$, and $T(2^t|2^{t-1})$. Similarly, potential transitions $T_0$, $T_{10}$, $T_{02}$, $T_{20}$, $T_{12}$, and $T_{21}$ may be represented by respective transition probability values $T(1^t|0^{t-1})$, $T(0^t|1^{t-1})$, $T(2^t|0^{t-1})$, $T(0^t|2^{t-1})$, $T(2^t|1^{t-1})$, and $T(1^t|2^{t-1})$. A full matrix, $T(N_i^t|M_i^{t-1})$, may then be constructed according to Eq. (2):

$$T(N_i^t \mid M_i^{t-1}) = \begin{Bmatrix} T(0^t \mid 0^{t-1}) & T(0^t \mid 1^{t-1}) & T(0^t \mid 2^{t-1}) \\ T(1^t \mid 0^{t-1}) & T(1^t \mid 1^{t-1}) & T(1^t \mid 2^{t-1}) \\ T(2^t \mid 0^{t-1}) & T(2^t \mid 2^{t-1}) & T(2^t \mid 2^{t-1}) \end{Bmatrix}$$

In some instances, the probability values, $T(N_i^t|M_i^{t-1})$, are assigned values based on a stickiness factor. The stickiness factor may be a probability of remaining at a wireless communication device divided by a probability of transitioning away from the wireless communication device (e.g., a probability ratio). For example, for the wireless communication network 800 of FIG. 8, the detected motion may be known to remain, five times out of eight, proximate any given wireless node 802. The stickiness factor may then be determined to be 0.625. As such, the non-transition probability values $T(0^t|0^{t-1})$, $T(1^t|1^{t-1})$, and $T(2^t|2^{t-1})$ may be assigned a value of 0.625. If the probability of transitioning to any one of the other two wireless nodes 802 is the same, the remaining transition probability values may be determined by (1−0.625)/2=0.1875. The transition probability matrix, $T(N_i^t|M_i^{t-1})$, may be constructed as follows:

$$T(N_i^t \mid M_i^{t-1}) = \begin{Bmatrix} 0.625 & 0.1875 & 0.1875 \\ 0.1875 & 0.625 & 0.1875 \\ 0.1875 & 0.1875 & 0.625 \end{Bmatrix}$$

In some implementations, a node in the wireless communication network 800 determines a location of the motion detected from the wireless signals exchanged during the subsequent time frame. The location determined is based on the first probability vector, the second probability vector, and the transition probability matrix. In further implementations, the wireless communication network 800 generates a third probability vector by combining the first probability vector, the second probability vector and the transition probability matrix. Generating the third probability vector may result from the data processing apparatus executing program instructions. The third probability vector includes the third values representing third probabilities of motion at the respective wireless communication devices during the subsequent time frame. In executing the program instructions, the wireless communication network 800 may also identify a wireless communication device associated with the highest of the third values. Moreover, the wireless communication network 800 may determine the location of the motion by identifying a location associated with the wireless communication device as the location of the motion detected during the first time frame.

In some variations, the third probability vector is represented by $P(N_i^t|L_j^t)$, where $N_i^t$ corresponds to the unique node identifier at a subsequent time frame (t) and $L_j^t$ corresponds to the unique link identifier at the first time frame (t). The third probability vector, $P(N_i^t|L_j^t)$, includes third values that represent, at the subsequent time frame, a probability of motion at wireless node, $N_i$, given link activity along wireless link, $L_j$. The third probability vector, $P(N_i^t|L_j^t)$, may be determined according to Eq. (3):

$$P(N_i^t \mid L_j^t) = \frac{[P(L_j^t \mid N_i^t) \cdot T(N_i^t \mid M_i^{t-1})] \cdot P(N_i^t)}{\sum_i P(L_j^t \mid N_i^t) P(N_i^t)} \quad (3)$$

where $T(N_i^t|M_i^{t-1})$, $P(L_j^t|N_i^t)$, and $P(N_i^t)$ are as described above in relation to Eqs. (1) and (2). Here, the subscript, t, indicates unique node or link identifier from the subsequent time frame (t). During recursive updating of the third probability vector, the third probability vector of a prior time, $P(N_i^{t-1}|L_j^{t-1})$, may serve as the second probability vector, $P(N_i^t)$, of the subsequent time frame. As such, $P(N_i^t) = P(N_i^{t-1}|L_j^{t-1})$ in Eq. (3), producing Eq. (4):

$$P(N_i^t \mid L_j^t) = \frac{[P(L_j^t \mid N_i^t) \cdot T(N_i^t \mid M_i^{t-1})] \cdot P(N_i^{t-1} \mid L_j^{t-1})}{\sum_i P(L_j^t \mid N_i^t) P(N_i^{t-1} \mid L_j^{t-1})} \quad (4)$$

Eqs. (3) and (4) may allow the wireless communication network 800 (or data processing apparatus) to determine the location of detected motion using Bayesian statistics while accounting for potential transitions between wireless nodes 802.

Figure 9:
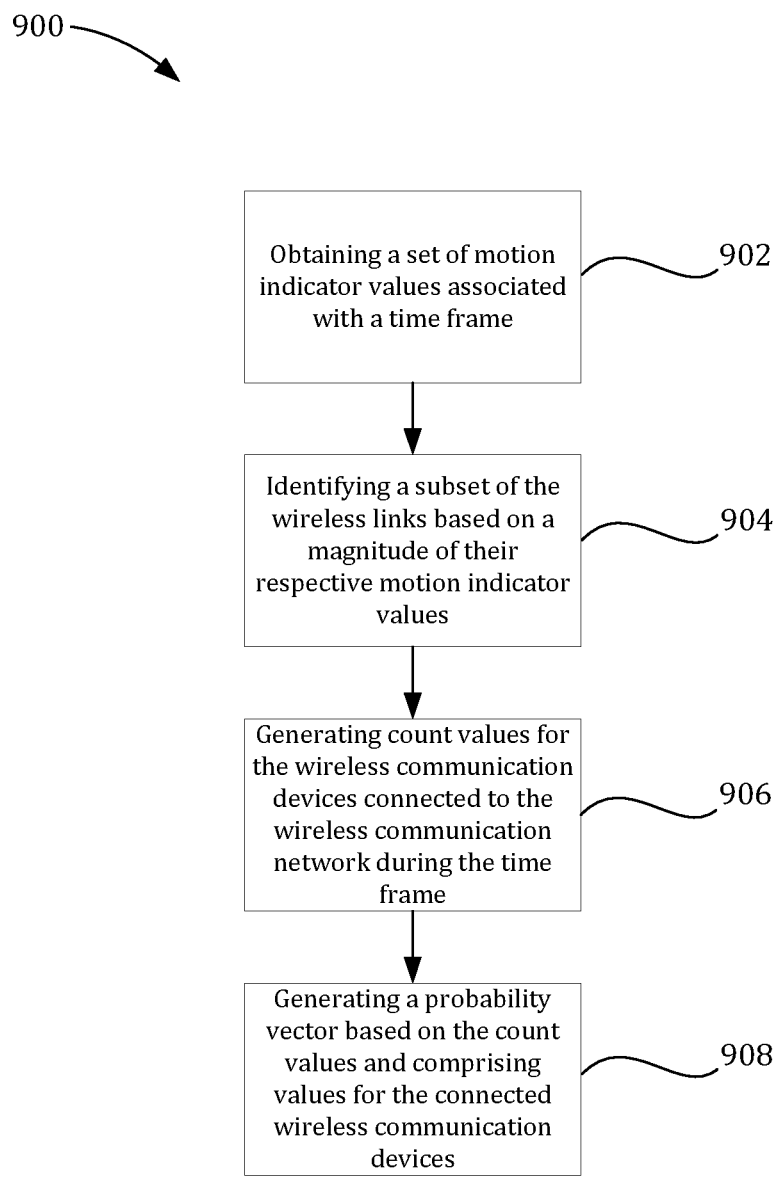
FIG. 9 is a flowchart showing another example process for determining a location of motion detected by wireless communication devices in a wireless communication network.

FIG. 9 is a flowchart showing another example process 900 for determining a location of motion detected by wireless communication devices in a wireless communication network. Operations in the example process 900 may be performed by a data processing apparatus (e.g., a processor in a wireless communication device 102 in FIG. 1A) to detect a location of motion based on signals received at wireless communication devices. The example process 900 may be performed by another type of device. For instance, operations of the process 900 may be performed by a system other than a wireless communication device (e.g., a computer system connected to the wireless communication system 100 of FIG. 1A that aggregates and analyzes signals received by the wireless communication devices 102).

The example process 900 may include additional or different operations, and the operations may be performed in the order shown or in another order. In some cases, one or more of the operations shown in FIG. 9 are implemented as processes that include multiple operations, sub-processes or other types of routines. In some cases, operations can be combined, performed in another order, performed in parallel, iterated, or otherwise repeated or performed another manner.

The example process 900 includes obtaining a set of motion indicator values associated with a time frame, as shown by operation 902. The set of motion indicator values indicate motion detected from wireless links in a wireless communication network during the time frame. Each motion indicator value is associated with a respective wireless link, and each wireless link is defined between a respective pair of wireless communication devices in the wireless communication network The example process 900 also includes identifying a subset of the wireless links based on a magnitude of their respective motion indicator values relative to other motion indicator values in the set of motion indicator values, as shown by operation 904. The example process 900 additionally includes generating count values for the wireless communication devices connected to the wireless communication network during the time frame, as shown by operation 906. The count value for each wireless communication device indicates how many wireless links in the identified subset are defined by the wireless communication device.

The example process 900 further includes generating a probability vector based on the count values and includes values for the connected wireless communication devices, as shown by operation 908. The value for each connected wireless communication device represents a probability of motion at the connected wireless communication device during the time frame.

In some implementations, the example process 900 includes altering one or more magnitudes of the set of motion indicator values to reference each motion indicator value to a common scale of wireless link sensitivity. In some implementations, the example process 900 includes identifying wireless links active in the wireless communication network during the time frame based on the set of motion indicator values. The example process 900 may optionally include identifying pairs of wireless communication devices that define each identified active wireless link, thereby identifying wireless communication devices connected to the wireless communication network during the time frame.

In some implementations, the time frame is a subsequent time frame that is after a prior time frame, the probability vector is a first probability vector, and the values are first values. In these implementations, the example process 900 includes obtaining a second probability vector generated from motion indicator values associated with the prior time frame. The second probability vector includes second values for wireless communication devices connected to the wireless communication network during the prior time frame. The second values represent probabilities of motion at the connected wireless communication devices during the prior time frame. The example process 900 also includes generating a third probability vector based on the first values of the first probability vector and the second values of the second probability vector. The third probability vector includes third values for the wireless communication devices connected to the wireless communication network during the subsequent time frame. The third values represent probabilities of motion at the connected wireless communication devices during the subsequent time frame. The example process 900 additionally includes identifying a wireless communication device associated with the highest of the third values, and identifying, by operation of a data processing apparatus, a location associated with the identified wireless communication device as a location of the motion detected from the wireless signals exchanged during the subsequent time frame.

In these implementations, the example process 900 may optionally include obtaining a transition probability matrix that comprises: [1] transition values representing probabilities of motion for transitioning between locations associated with distinct wireless communication devices, and [2] non-transition values representing probabilities of motion for remaining within locations associated with the respective wireless communication devices. The generating the third probability vector includes generating the third probability vector based on the first values of the first probability vector, the second values of the second probability vector, and the transition and non-transition values of the transition probability matrix.

Also in these implementations, the example process 900 may optionally include repeating the operations, over multiple iterations for respective time frames, of obtaining the set of motion indicator values, identifying the subset of the wireless links, generating the count values, generating the first probability vector, obtaining the second probability vector, generating the third probability vector, identifying the wireless communication device, and identifying the location. The third probability vector of a previous iteration serves as the second probability vector of a present iteration, thereby allowing the third probability vector to be recursively updated.

Figure 10:
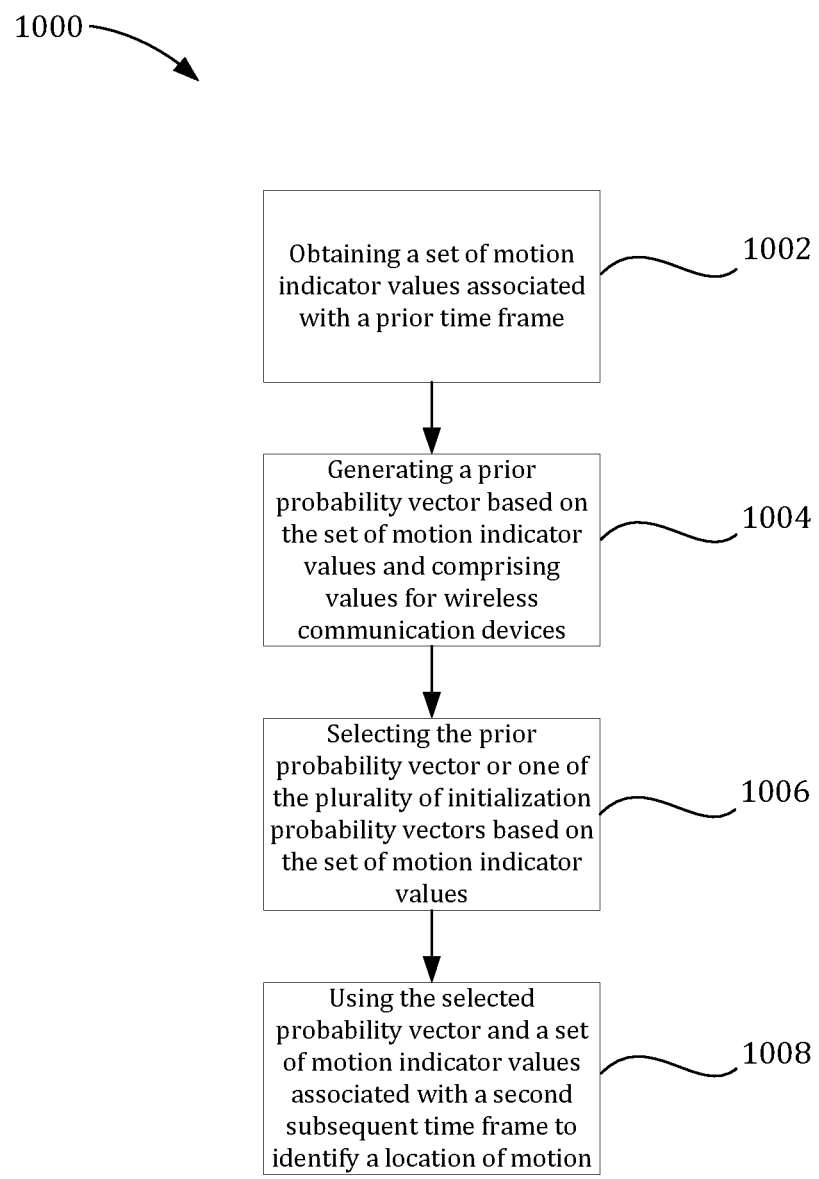
FIG. 10 is a flowchart showing an additional example process for determining a location of motion detected by wireless communication devices in a wireless communication network.

FIG. 10 is a flowchart showing an additional example process 1000 for determining a location of motion detected by wireless communication devices in a wireless communication network. Operations in the example process 1000 may be performed by a data processing apparatus (e.g., a processor in a wireless communication device 102 in FIG. 1A) to detect a location of motion based on signals received at wireless communication devices. The example process 1000 may be performed by another type of device. For instance, operations of the example process 1000 may be performed by a system other than a wireless communication device (e.g., a computer system connected to the wireless communication system 100 of FIG. 1A that aggregates and analyzes signals received by the wireless communication devices 102).

The example process 1000 may include additional or different operations, and the operations may be performed in the order shown or in another order. In some cases, one or more of the operations shown in FIG. 10 are implemented as processes that include multiple operations, sub-processes or other types of routines. In some cases, operations can be combined, performed in another order, performed in parallel, iterated, or otherwise repeated or performed another manner.

The example process 1000 includes obtaining a set of motion indicator values associated with a prior time frame, as shown by operation 1002. The set of motion indicator values indicate motion detected from wireless links in a wireless communication network during the prior time frame. Each motion indicator value associated with a respective wireless link. Each wireless link defined between a respective pair of wireless communication devices of the wireless communication network.

The example process 1000 also includes generating a prior probability vector based on the set of motion indicator values and including values for wireless communication devices connected to the wireless communication network during the prior time frame. The values represent a probability of motion at the connected wireless communication devices during the prior time frame.

The example process 1000 additionally includes selecting the prior probability vector or one of a plurality of initialization probability vectors based on the set of motion indicator values, a configuration of the wireless communication network, or both. The example process 1000 further includes using the selected probability vector and a set of motion indicators associated with a second, subsequent time frame to identify a location associated with motion that occurred during the subsequent time frame.

In some implementations, the plurality of initialization probability vectors includes an initialization probability vector having probability values for wireless communication devices connected to the wireless communication network during the subsequent time frame. The probability values are equal in magnitude and represent probabilities of motion at the connected wireless communication devices during the subsequent time frame.

In some implementations, the plurality of initialization probability vectors includes an initialization probability vector having probability values for wireless communication devices connected to the wireless communication network during the subsequent time frame. At least one probability value has a magnitude based on a location of a corresponding wireless communication device. The probability values represent probabilities of motion at the connected wireless communication devices during the subsequent time frame.

In some implementations, the example process 1000 includes determining a change in wireless connectivity between the prior and subsequent time frames. The change in wireless connectivity includes one or both of: [1] wireless communication devices that have connected to the wireless communication network between the prior and subsequent time frames, and [2] wireless communication devices that have disconnected from the wireless communication network between the prior and subsequent time frames. The example process 1000 also includes generating an initialization probability vector of the plurality of initialization probability vectors by altering the values of the prior probability vector based on the change in wireless connectivity.

In these implementations, the change in wireless connectivity may optionally include wireless communication devices that have disconnected from the wireless communication network between the prior and subsequent time frames. The operation of generating the initialization probability vector then includes apportioning values of the prior probability vector associated with the disconnected wireless communication devices to values of wireless communication devices that have remained connected to the wireless communication network.

Also in these implementations, the change in wireless connectivity may optionally include wireless communication devices that have connected to the wireless communication network between the prior and subsequent time frames. The operation of generating the initialization probability vector then includes adding values to the prior probability vector for wireless communication devices that have connected to the wireless communication network.

Additionally in these implementations, the example process 1000 may optionally include monitoring a connection status of a wireless communication device over multiple iterations for respective time frames. The connection status indicates either a connected state and a disconnected state. The example process 1000 then includes identifying, for the subsequent time frame, the wireless communication device as a disconnected wireless communication device if the connection status has indicated the disconnected state successively for a predetermined number of time frames.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, program instructions, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   obtaining a set of motion indicator values associated with a prior time frame, the set of motion indicator values indicating motion detected from wireless links in a wireless communication network during the prior time frame, each motion indicator value associated with a respective wireless link, each wireless link defined between a respective pair of wireless communication devices of the wireless communication network;
   generating a prior probability vector based on the set of motion indicator values and comprising values for wireless communication devices connected to the wireless communication network during the prior time frame, the values representing a probability of motion at the connected wireless communication devices during the prior time frame;
   selecting the prior probability vector or one of a plurality of initialization probability vectors based on the set of motion indicator values, a configuration of the wireless communication network, or both; and
   using the selected probability vector and a set of motion indicator values associated with a second, subsequent time frame to identify a location associated with motion that occurred during the subsequent time frame.

2. The method of claim 1,
   wherein the plurality of initialization probability vectors comprises an initialization probability vector having probability values for wireless communication devices connected to the wireless communication network during the subsequent time frame, the probability values being equal in magnitude and representing probabilities of motion at the connected wireless communication devices during the subsequent time frame.

3. The method of claim 1,
   wherein the plurality of initialization probability vectors comprises an initialization probability vector having probability values for wireless communication devices connected to the wireless communication network during the subsequent time frame, at least one probability value having a magnitude based on a location of a corresponding wireless communication device, the probability values representing probabilities of motion at the connected wireless communication devices during the subsequent time frame.

4. The method of claim 1, comprising:
   determining a change in wireless connectivity between the prior and subsequent time frames, the change in wireless connectivity comprising one or both of:
      wireless communication devices that have connected to the wireless communication network between the prior and subsequent time frames, and
      wireless communication devices that have disconnected from the wireless communication network between the prior and subsequent time frames; and
   generating an initialization probability vector of the plurality of initialization probability vectors by altering the values of the prior probability vector based on the change in wireless connectivity.

5. The method of claim 4,
   wherein the change comprises wireless communication devices that have disconnected from the wireless communication network between the prior and subsequent time frames; and
   wherein generating the initialization probability vector comprises apportioning values of the prior probability vector associated with the disconnected wireless communication devices to values of wireless communication devices that have remained connected to the wireless communication network.

6. The method of claim 4,
   wherein the change comprises wireless communication devices that have connected to the wireless communication network between the prior and subsequent time frames; and
   wherein generating the initialization probability vector comprises adding values to the prior probability vector for wireless communication devices that have connected to the wireless communication network.

7. The method of claim 4, comprising:
   monitoring a connection status of a wireless communication device over multiple iterations for respective time frames, the connection status indicating either a connected state and a disconnected state; and
   identifying, for the subsequent time frame, the wireless communication device as a disconnected wireless communication device if the connection status has indicated the disconnected state successively for a predetermined number of time frames.

8. A system comprising:
   wireless communication devices in a wireless communication network that are configured to exchange wireless signals over wireless links, each wireless link defined between a respective pair of the wireless communication devices; and
   one or more processors; and
   memory storing instructions that are configured to perform operations when executed by the one or more processors, the operations comprising:
      obtaining a set of motion indicator values associated with a prior time frame, the set of motion indicator values indicating motion detected from the wireless links in the wireless communication network during the prior time frame, each motion indicator value associated with a respective wireless link,
      generating a prior probability vector based on the set of motion indicator values and comprising values for wireless communication devices connected to the wireless communication network during the prior time frame, the values representing a probability of motion at the connected wireless communication devices during the prior time frame,
      selecting the prior probability vector or one of a plurality of initialization probability vectors based on the set of motion indicator values, a configuration of the wireless communication network, or both, and
      using the selected probability vector and a set of motion indicators associated with a second, subsequent time frame to identify a location associated with motion that occurred during the subsequent time frame.

9. The system of claim 8,
wherein the plurality of initialization probability vectors comprises an initialization probability vector having probability values for wireless communication devices connected to the wireless communication network during the subsequent time frame, the probability values being equal in magnitude and representing probabilities of motion at the connected wireless communication devices during the subsequent time frame.

10. The system of claim 8,
wherein the plurality of initialization probability vectors comprises an initialization probability vector having probability values for wireless communication devices connected to the wireless communication network during the subsequent time frame, at least one probability value having a magnitude based on a location of a corresponding wireless communication device, the probability values representing probabilities of motion at the connected wireless communication devices during the subsequent time frame.

11. The system of claim 8:
wherein the operations comprise:
    determining a change in wireless connectivity between the prior and subsequent time frames, the change in wireless connectivity comprising one or both of:
        wireless communication devices that have connected to the wireless communication network between the prior and subsequent time frames, and
        wireless communication devices that have disconnected from the wireless communication network between the prior and subsequent time frames; and
    generating an initialization probability vector of the plurality of initialization probability vectors by altering the values of the prior probability vector based on the change in wireless connectivity.

12. The system of claim 11,
wherein the change comprises wireless communication devices that have disconnected from the wireless communication network between the prior and subsequent time frames; and
wherein generating the initialization probability vector comprises apportioning values of the prior probability vector associated with the disconnected wireless communication devices to values of wireless communication devices that have remained connected to the wireless communication network.

13. The system of claim 11,
wherein the change comprises wireless communication devices that have connected to the wireless communication network between the prior and subsequent time frames; and
wherein generating the initialization probability vector comprises adding values to the prior probability vector for wireless communication devices that have connected to the wireless communication network.

14. The system of claim 11, the operations comprising:
monitoring a connection status of a wireless communication device over multiple iterations for respective time frames, the connection status indicating either a connected state and a disconnected state; and
identifying, for the subsequent time frame, the wireless communication device as a disconnected wireless communication device if the connection status has indicated the disconnected state successively for a predetermined number of time frames.

15. The system of claim 8, wherein at least one of the wireless communication devices comprises the one or more processors and the memory.

16. A non-transitory computer-readable medium storing instructions that, when executed by data processing apparatus, cause the data processing apparatus to perform operations comprising:
    obtaining a set of motion indicator values associated with a prior time frame, the set of motion indicator values indicating motion detected from wireless links in a wireless communication network during the prior time frame, each motion indicator value associated with a respective wireless link, each wireless link defined between a respective pair of wireless communication devices of the wireless communication network;
    generating a prior probability vector based on the set of motion indicator values and comprising values for wireless communication devices connected to the wireless communication network during the prior time frame, the values representing a probability of motion at the connected wireless communication devices during the prior time frame;
    selecting the prior probability vector or one of a plurality of initialization probability vectors based on the set of motion indicator values, a configuration of the wireless communication network, or both; and
    using the selected probability vector and a set of motion indicators associated with a second, subsequent time frame to identify a location associated with motion that occurred during the subsequent time frame.

17. The computer-readable medium of claim 16,
wherein the plurality of initialization probability vectors comprises an initialization probability vector having probability values for wireless communication devices connected to the wireless communication network during the subsequent time frame, the probability values being equal in magnitude and representing probabilities of motion at the connected wireless communication devices during the subsequent time frame.

18. The computer-readable medium of claim 16,
wherein the plurality of initialization probability vectors comprises an initialization probability vector having probability values for wireless communication devices connected to the wireless communication network during the subsequent time frame, at least one probability value having a magnitude based on a location of a corresponding wireless communication device, the probability values representing probabilities of motion at the connected wireless communication devices during the subsequent time frame.

19. The computer-readable medium of claim 16,
wherein the operations comprise:
    determining a change in wireless connectivity between the prior and subsequent time frames, the change in wireless connectivity comprising one or both of:
        wireless communication devices that have connected to the wireless communication network between the prior and subsequent time frames, and
        wireless communication devices that have disconnected from the wireless communication network between the prior and subsequent time frames; and
    generating an initialization probability vector of the plurality of initialization probability vectors by altering the values of the prior probability vector based on the change in wireless connectivity.

20. The computer-readable medium of claim 19,
wherein the change comprises wireless communication devices that have disconnected from the wireless communication network between the prior and subsequent time frames; and
wherein generating the initialization probability vector comprises apportioning values of the prior probability vector associated with the disconnected wireless communication devices to values of wireless communication devices that have remained connected to the wireless communication network.

21. The computer-readable medium of claim 19,
wherein the change comprises wireless communication devices that have connected to the wireless communication network between the prior and subsequent time frames; and
wherein generating the initialization probability vector comprises adding values to the prior probability vector for wireless communication devices that have connected to the wireless communication network.

22. The computer-readable medium of claim 19, the operations comprising:
monitoring a connection status of a wireless communication device over multiple iterations for respective time frames, the connection status indicating either a connected state and a disconnected state; and
identifying, for the subsequent time frame, the wireless communication device as a disconnected wireless communication device if the connection status has indicated the disconnected state successively for a predetermined number of time frames.

\* \* \* \* \*

UNITED STATES PATENT AND TRADEMARK OFFICE
CERTIFICATE OF CORRECTION

| | | |
|---|---|---|
| PATENT NO. | : 10,567,914 B1 | Page 1 of 1 |
| APPLICATION NO. | : 16/399681 | |
| DATED | : February 18, 2020 | |
| INVENTOR(S) | : Omer et al. | |

It is certified that error appears in the above-identified patent and that said Letters Patent is hereby corrected as shown below:

In the Claims

Column 35, Line 21, Claim 22, before "computer-readable", insert -- non-transitory -- therefor.

Signed and Sealed this
Twelfth Day of May, 2020

Andrei Iancu
*Director of the United States Patent and Trademark Office*